US011308907B2

(12) United States Patent
Zhang et al.

(10) Patent No.: US 11,308,907 B2
(45) Date of Patent: Apr. 19, 2022

(54) SHIFT REGISTER AND DRIVING METHOD OF SHIFT REGISTER, GATE DRIVING CIRCUIT AND DISPLAY PANEL AND DEVICE

(71) Applicant: SHANGHAI TIANMA AM-OLED CO., LTD., Shanghai (CN)

(72) Inventors: Mengmeng Zhang, Shanghai (CN); Xingyao Zhou, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 0 days.

(21) Appl. No.: 17/138,925

(22) Filed: Dec. 31, 2020

(65) Prior Publication Data

US 2021/0118389 A1 Apr. 22, 2021

(30) Foreign Application Priority Data

Nov. 16, 2020 (CN) ........................ 202011280140.0

(51) Int. Cl.

*G09G 3/36* (2006.01)
*G06F 3/038* (2013.01)
*G09G 5/00* (2006.01)
*G09G 3/3258* (2016.01)

(52) U.S. Cl.

CPC ......... *G09G 3/3655* (2013.01); *G09G 3/3258* (2013.01); *G09G 3/3677* (2013.01); *G09G 2310/0286* (2013.01); *G09G 2310/08* (2013.01)

(58) Field of Classification Search

CPC .......................... G09G 3/3648; G09G 3/3677
See application file for complete search history.

(56) References Cited

U.S. PATENT DOCUMENTS 6,388,653 B1 * 5/2002 Goto .................... G09G 3/3688 345/96
2016/0063962 A1 * 3/2016 Park ..................... G09G 3/3611 345/211

FOREIGN PATENT DOCUMENTS

| | | | |
|---|---|---|---|
| CN | 103280198 | A | 9/2013 |
| CN | 110580881 | A | 12/2019 |
| CN | 110972504 | A | 4/2020 |
| CN | 111145823 | A | 5/2020 |

* cited by examiner

*Primary Examiner* — Nan-Ying Yang
(74) *Attorney, Agent, or Firm* — Kilpatrick Townsend & Stockton, LLP

(57) ABSTRACT

Provided are a shift register and a driving method of a shift register, a gate driving circuit and a display panel and device. The shift register includes a first power signal input terminal, a second power signal input terminal, a first signal output terminal, a first node control device, a first output device, a first voltage stabilizing device and a first clock signal terminal, where a first terminal of the first voltage stabilizing device is electrically connected to an output terminal of the first node control device at a first node, a second terminal of the first voltage stabilizing device is electrically connected to a first control terminal of the first output device at a second node, and a control terminal of the first voltage stabilizing device is electrically connected to the first clock signal terminal.

21 Claims, 16 Drawing Sheets

SHIFT REGISTER AND DRIVING METHOD OF SHIFT REGISTER, GATE DRIVING CIRCUIT AND DISPLAY PANEL AND DEVICE

CROSS-REFERENCE TO RELATED APPLICATION

This application claims priority to Chinese Patent Application No. 202011280140.0 filed Nov. 16, 2020, the disclosure of which is incorporated herein by reference in its entirety.

FIELD

Embodiments of the present disclosure relate to the field of display and, in particular, to a shift register and a driving method of a shift register, a gate driving circuit and a display panel and device.

BACKGROUND

With the development of display technologies, the power consumption of the display device increases while higher resolution of the display device is demanded. In order to reduce the power consumption of the display device, the frame rate may be reduced during a period of time to drive pixels with a low speed. For example, in a mobile terminal, a normal driving frequency based on 60 Hz or 120 Hz is performed for a normal display mode, and a driving frequency based on 1 Hz~5 Hz is performed for a standby mode, thus reducing the power consumption.

In the related art, a design of positive channel metal oxide semiconductor (PMOS) field effect transistors is generally adopted in a shift register circuit. However, due to the large leakage current of PMOS formed by a low temperature poly-silicon (LTPS) material, during the driving with a low frame rate, the data update period is relatively long. In the case where a leakage current exists in the shift register circuit, the shift register circuit cannot output stable control signals, so that the picture displayed by the display device flickers and the display effect is affected.

SUMMARY

The present disclosure provides a shift register and a driving method of a shift register, a gate driving circuit and a display panel and device. A first voltage stabilizing device is added into a shift register circuit. Since a leakage current of the first voltage stabilizing device is small, a leakage current of a second node is reduced, and the stable output of a first signal output terminal and the normal display of the display panel are ensured.

In a first aspect, an embodiment of the present disclosure provides a shift register. The shift register includes a first power signal input terminal, a second power signal input terminal, a first signal output terminal, a first node control device, a first output device, a first voltage stabilizing device and a first clock signal terminal.

A first terminal of the first voltage stabilizing device is electrically connected to an output terminal of the first node control device at a first node, a second terminal of the first voltage stabilizing device is electrically connected to a first control terminal of the first output device at a second node, and a control terminal of the first voltage stabilizing device is electrically connected to the first clock signal terminal.

A first input terminal of the first output device is electrically connected to the first power signal input terminal, a second input terminal of the first output device is electrically connected to the second power signal input terminal, and an output terminal of the first output device is electrically connected to the first signal output terminal.

In a display stage of a first frequency, the first voltage stabilizing device is configured to be turned on according to a control signal provided by the first clock signal terminal; in a display stage of a second frequency, the first voltage stabilizing device is configured to be turned on or turned off according to a control signal provided by the first clock signal terminal; where the first frequency is greater than the second frequency.

In a second aspect, an embodiment of the present disclosure further provides a driving method of a shift register, which is applied for driving the shift register described in the first aspect. The driving method includes the steps described below.

In the display stage of the first frequency, a control signal of the first clock signal terminal controls the first voltage stabilizing device to be turned on.

In the display stage of the second frequency, a control signal of the first clock signal terminal controls the first voltage stabilizing device to be turned on or turned off; where the first frequency is greater than the second frequency.

In a third aspect, an embodiment of the present disclosure further provides a gate driving circuit. The gate driving circuit includes cascaded shift registers provided by the first aspect.

A shift register signal input terminal of the shift register at a first level is electrically connected to an initial signal input terminal of the gate driving circuit, and the first signal output terminal of the shift register at an i-th level is electrically connected to a shift register signal input terminal of the shift register at an (i+1)-th level; where i is a positive integer.

In a fourth aspect, an embodiment of the present disclosure further provides a display panel. The display panel includes a display region and a non-display region surrounding the display region, where the non-display region is provided with a gate driving circuit, and the gate driving circuit is the gate driving circuit provided by the third aspect.

In a fifth aspect, an embodiment of the present disclosure further provides a display device. The display device includes the display panel provided by the fourth aspect.

For the shift register and the driving method of the shift register, the gate driving circuit and the display panel and device, the shift register includes the first voltage stabilizing device and the first clock signal terminal, the control terminal of the first voltage stabilizing device is electrically connected to the first clock signal terminal. In a display stage of a high frequency, a clock signal provided by the first clock signal terminal controls the first voltage stabilizing device to be turned on, and based on the characteristics of fast display refreshing and a small leakage current of the first voltage stabilizing device, the potential of the second node is not raised, to ensure that the first signal output terminal outputs a stable control signal. In a display stage of a low frequency, a clock signal provided by the first clock signal terminal controls the first voltage stabilizing device to be turned on or turned off, and when the first voltage stabilizing device is turned off, the transmission path of the leakage current between the first node and the second node is blocked, so that the potential of the second node is not raised, and it is ensured that the first signal output terminal outputs a stable control signal. Even in the display stage of the low frequency, a clock signal provided by the first clock signal terminal controls the first voltage stabilizing device to be turned on, and since the leakage current of the first voltage stabilizing device is small, the raise of the potential of the second node is limited, it can also be ensured that the first signal output terminal outputs a stable control signal, and the normal display of the display panel is ensured.

DETAILED DESCRIPTION

Figure 1:
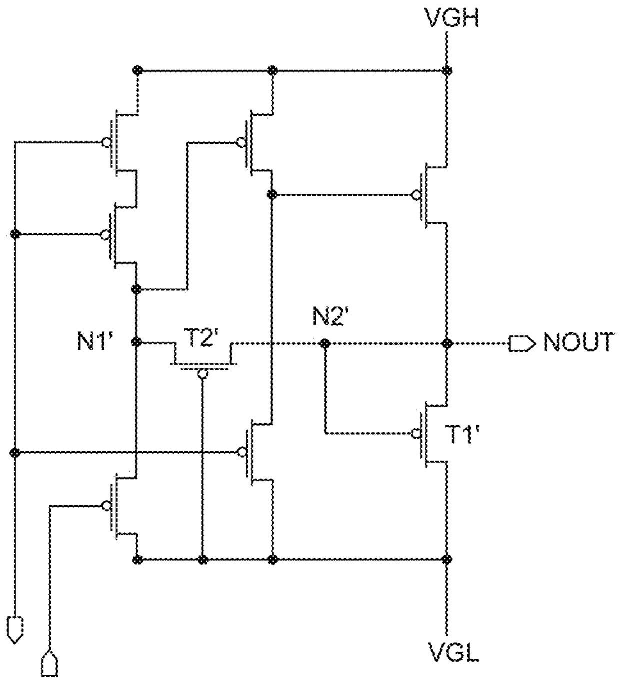
FIG. 1 is a schematic diagram of part of a circuit of a shift register in the related art.

The present disclosure is further described below in detail in conjunction with the drawings and embodiments. It is to be understood that the embodiments described herein are merely intended to illustrate and not to limit the present disclosure. In addition, it should be noted that for easy of description, only the part, but not all, of the structures related to the present disclosure is illustrated in the drawings.

Figure 2:
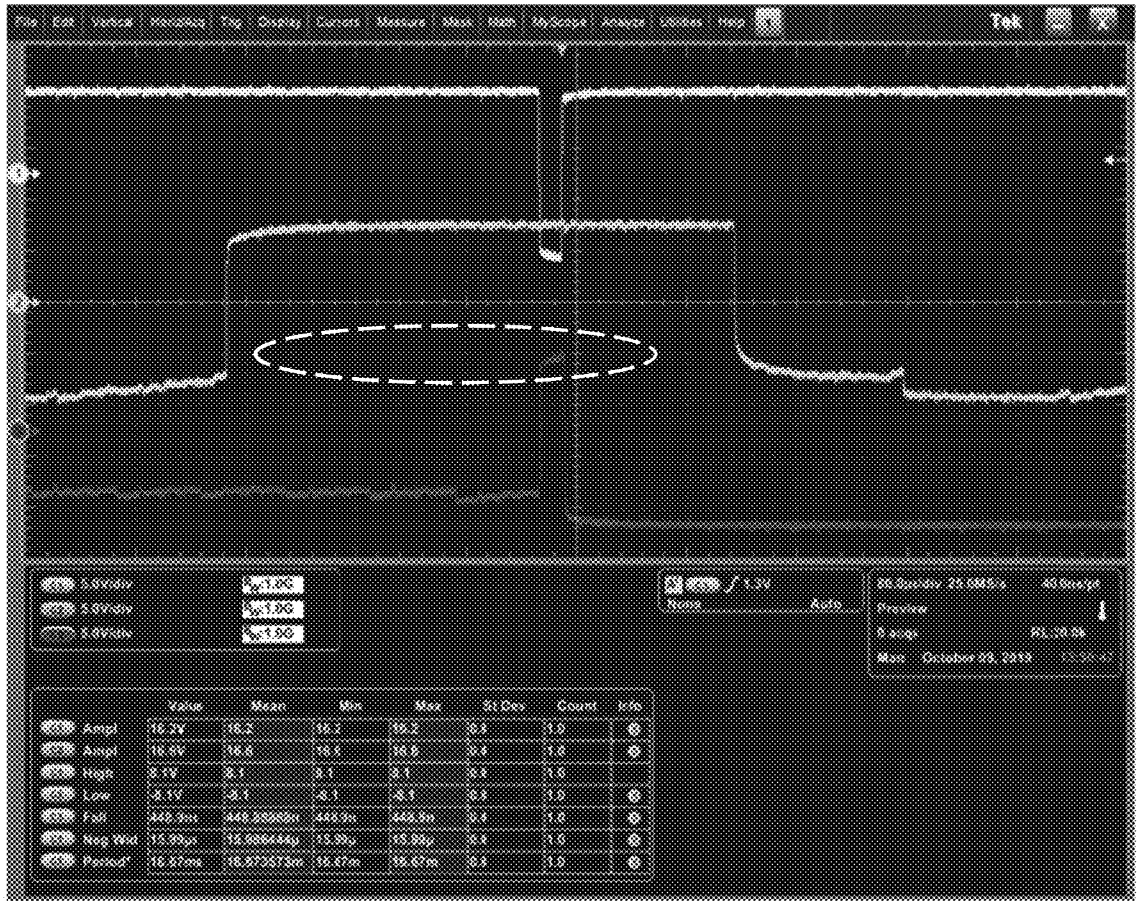
FIG. 2 is a schematic diagram of output signals of a shift register corresponding to FIG. 1.

FIG. 1 is a schematic diagram of part of a circuit of a shift register in the related art, showing a shift register according to a design of PMOSs. As shown in FIG. 1, a gate of a first transistor T1' for controlling the output of a scan N in the shift register circuit is connected to a node N1' with a relatively high potential through a second transistor T2'. Since a leakage current exists in the second transistor T2', during the driving with a low frequency, the scan N needs to be maintained for a long time due to the low display refreshing frequency. The potential of the scan N may be raised due to a leakage current of the node N2', and the display brightness of the display device changes. For example, during the displaying with 1 Hz, the node N2' in FIG. 1 may leak a current towards the node N1' (the second transistor T2' is a normally-on transistor), and finally, the potential of the node N2' is raised and gradually greater than a VGL voltage. Therefore, the opening of the first transistor T1' is affected, and the normal output of the low level power voltage VGL to NOUT is affected. Since the scan N (a low level VGL) output and controlled by N2' is used for closing an indium gallium zinc oxide (IGZO) transistor in a pixel circuit, when the low potential of the scan N is raised, the closing characteristic of the IGZO transistor is affected, a leakage current may occur in the pixel circuit, the pixel brightness may change, and the screen may flicker. FIG. 2 is a schematic diagram of output signals of a shift register corresponding to FIG. 1. As can be clearly seen by comparing the dashed-out part of FIG. 2 with the part on the right of the dashed-out part, for the scan N signal output by the shift register provided by FIG. 1, there is a significant situation that the low potential upwarps, so that the closing characteristic of the IGZO transistor in the pixel circuit is affected, the leakage current may occur in the pixel circuit, the pixel brightness may change, and the screen may flicker.

An embodiment of the present disclosure provides a shift register. The shift register includes a first power signal input terminal, a second power signal input terminal, a first signal output terminal, a first node control device, a first output device, a first voltage stabilizing device and a first clock signal terminal. A first terminal of the first voltage stabilizing device is electrically connected to an output terminal of the first node control device at a first node. A second terminal of the first voltage stabilizing device is electrically connected to a first control terminal of the first output device at a second node. A control terminal of the first voltage stabilizing device is electrically connected to the first clock signal terminal. A first input terminal of the first output device is electrically connected to the first power signal input terminal. A second input terminal of the first output device is electrically connected to the second power signal input terminal. An output terminal of the first output device is electrically connected to the first signal output terminal. In a display stage of a first frequency, the first voltage stabilizing device is configured to be turned on according to a control signal provided by the first clock signal terminal. In a display stage of a second frequency, the first voltage stabilizing device is configured to be turned on or turned off according to a control signal provided by the first clock signal terminal. The first frequency is greater than the second frequency. According to the above embodiments, the shift register includes the first voltage stabilizing device and the first clock signal terminal, the control terminal of the first voltage stabilizing device is electrically connected to the first clock signal terminal. In a display stage of a high frequency, a clock signal provided by the first clock signal terminal controls the first voltage stabilizing device to be turned on. Based on the characteristics of fast display refreshing and a small leakage current of the first voltage stabilizing device, the potential of the second node is not raised, to ensure that the first signal output terminal outputs a stable control signal. In a display stage of a low frequency, a clock signal provided by the first clock signal terminal controls the first voltage stabilizing device to be turned on or turned off, and when the first voltage stabilizing device is turned off, the transmission path of the leakage current between the first node and the second node is blocked, so that the potential of the second node is not raised, and it is ensured that the first signal output terminal outputs a stable control signal. Even in the display stage of the low frequency, a clock signal provided by the first clock signal terminal controls the first voltage stabilizing device to be turned on, and since the leakage current of the first voltage stabilizing device is small, the raise of the potential of the second node is limited, it can also be ensured that the first signal output terminal outputs a stable control signal, and the normal display of the display panel is ensured.

The above is one embodiment of the present disclosure. Hereinafter, the embodiments of the present disclosure will be described clearly and completely in conjunction with the drawings in the embodiments of the present disclosure.

Figure 3:
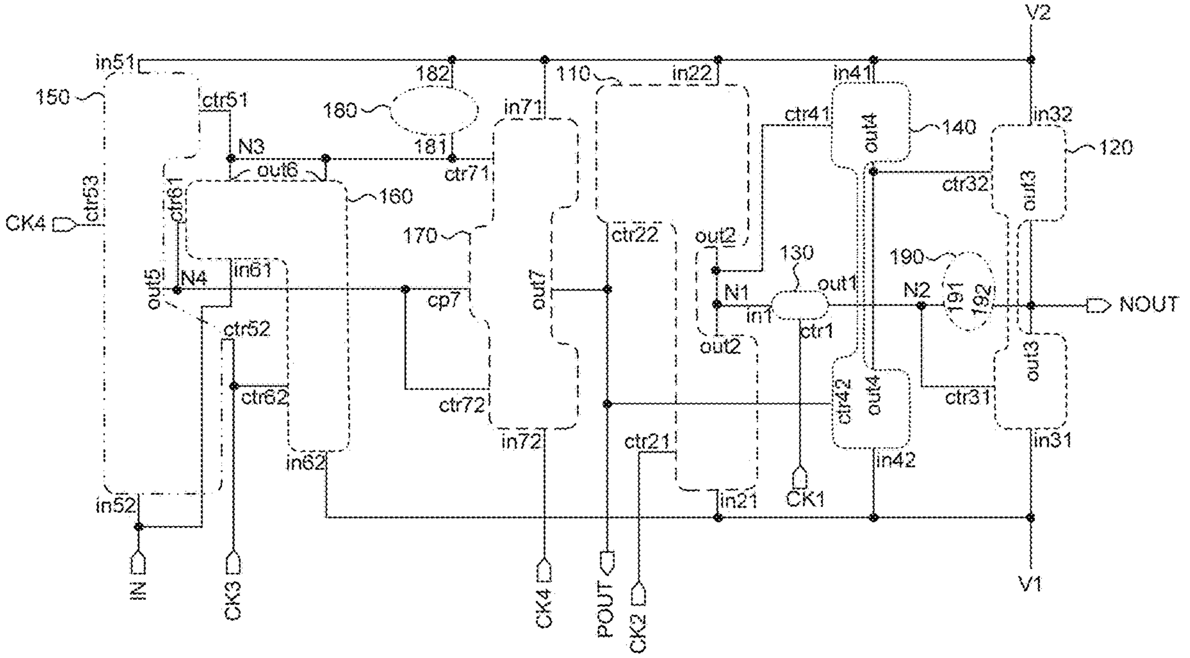
FIG. 3 is a schematic diagram of a circuit of a shift register according to an embodiment of the present disclosure.

FIG. 3 is a schematic diagram of a circuit of a shift register according to an embodiment of the present disclosure. As shown in FIG. 3, the shift register provided by the embodiment of the present disclosure includes a first power signal input terminal V1, a second power signal input terminal V2, a first signal output terminal NOUT, a first node control device 110, a first output device 120, a first voltage stabilizing device 130 and a first clock signal terminal CK1. A first terminal in1 of the first voltage stabilizing device 130 is electrically connected to an output terminal out2 of the first node control device 110 at a first node N1. A second terminal out1 of the first voltage stabilizing device 130 is electrically connected to a first control terminal ctr31 of the first output device 120 at a second node N2. A control terminal ctrl of the first voltage stabilizing device 130 is electrically connected to the first clock signal terminal CK1. A first input terminal in31 of the first output device 120 is electrically connected to the first power signal input terminal V1. A second input terminal in32 of the first output device 120 is electrically connected to the second power signal input terminal V2, and an output terminal out3 of the first output device 120 is electrically connected to the first signal output terminal NOUT. In a display stage of a first frequency, the first voltage stabilizing device 130 is configured to be turned on according to a control signal provided by the first clock signal terminal CK1. In a display stage of a second frequency, the first voltage stabilizing device 130 is configured to be turned on or turned off according to a control signal provided by the first clock signal terminal CK1. The first frequency is greater than the second frequency.

As shown in FIG. 3, the first node control device 110 includes a first input terminal in21, a second input terminal in22, a first control terminal ctr21, a second control terminal ctr22 and the output terminal out2. The first input terminal in21 of the first node control device 110 is electrically connected to the first power signal input terminal V1, and the second input terminal in22 is electrically connected to the second power signal input terminal V2. When the first control terminal ctr21 receives an enable signal, a signal output by the output terminal out2 of the first node control device 110 is a first power signal VGL. When the second control terminal ctr22 receives an enable signal, a signal output by the output terminal out2 of the first node control device 110 is a second power signal VGH.

Further, the first output device 120 includes the first input terminal in31, the second input terminal in32, the first control terminal ctr31, a second control terminal ctr32 and the output terminal. The first input terminal in31 of the first output device 120 is electrically connected to the first power signal input terminal V1, and the second input terminal in32 is electrically connected to the second power signal input terminal V2. When the first control terminal ctr31 receives an enable signal, a signal output by the output terminal out3 of the first output device 120 is the first power signal VGL. When the second control terminal ctr32 receives an enable signal, a signal output by the output terminal out3 of the first output device 120 is the second power signal VGH.

Since the output terminal out2 of the first node control device 110 is connected to the first node N1, a potential signal of the first node N1 is the potential signal output by the first node control device 110. Since the first control terminal ctr31 of the first output device 120 is connected to the second node N2, a potential signal of the second node N2 is the control signal of the first control terminal ctr31 of the first output device 120. Since the PMOS transistor is generally adopted in the shift register, whether the first node control device 110 outputs a VGL signal or a VGH signal, the enable signal of the PMOS transistor is a high potential signal. In the related art (as shown in FIG. 1), the PMOS transistor of an LTPS type is disposed at the first node N1 and the second node N2. The situation of the leakage current of the LTPS is serious, particularly in a display stage of a low frequency, so that the display refreshing frequency is low, and the leakage current of the LTPS is intensified, resulting in that the potential of the second node N2 is raised and gradually greater than the VGL voltage. Therefore, the normal opening of the transistor controlled by the first control terminal ctr31 of the first output device 120 is affected, and the normal output of the low level power voltage VGL to the NOUT is affected. Therefore, according to the embodiment of the present disclosure, the first voltage stabilizing device 130 is added between the first node N1 and the second node N2. The first voltage stabilizing device 130 has a characteristic of a small leakage current. Further, the first terminal in1 of the first voltage stabilizing device 130 is electrically connected to the output terminal out2 of the first node control device 110 at the first node N1; the second terminal out1 of the first voltage stabilizing device 130 is electrically connected to the first control terminal ctr31 of the first output device 120 at the second node N2; and the control terminal ctrl of the first voltage stabilizing device 130 is electrically connected to the first clock signal terminal CK1. In the display stage of the first frequency (a high frequency), the first voltage stabilizing device 130 is turned on under the action of a clock signal provided by the first clock signal terminal CK1. Since the display refreshing frequency is high and the leakage current of the first voltage stabilizing device 130 is small, the potential of the second node N2 is stable and the raise of the potential caused by the leakage current does not occur. Therefore, it is ensured that the first output device 120 outputs a stable scan N signal. In the display stage of the second frequency (a low frequency), the first voltage stabilizing device 130 is turned on or turned off under the action of the clock signal provided by the first clock signal terminal CK1. When the first voltage stabilizing device is turned off, the transmission path of the leakage current between the first node N1 and the second node N2 is blocked, so that the potential of the second node N2 is not raised, and it is ensured that the first signal output terminal NOUT outputs a stable scan N signal. Even the first voltage stabilizing device 130 is turned on, since the leakage current of the first voltage stabilizing device 130 is small, and the raise of the potential of the second node N2 is limited, so it can also be ensured that the first signal output terminal NOUT outputs a stable scan N signal, the normal display of the display panel driven by the stable scan N signal is ensured, and the flickering does not occur.

Further, the first voltage stabilizing device 130 may be a first voltage stabilizing transistor. The first voltage stabilizing transistor may be an oxide semiconductor transistor, such as an IGZO transistor. The oxide semiconductor transistor is an N-type transistor with high stability and a small leakage current. Even in the display stage of the low frequency, when the oxide semiconductor transistor is turned on, the leakage current of the oxide semiconductor transistor is can be ignored compared with the leakage current of the LTPS transistor, so that the raise of the potential of the second node N2 is limited and the stable output of the first signal output terminal NOUT cannot be affected.

Figure 4:
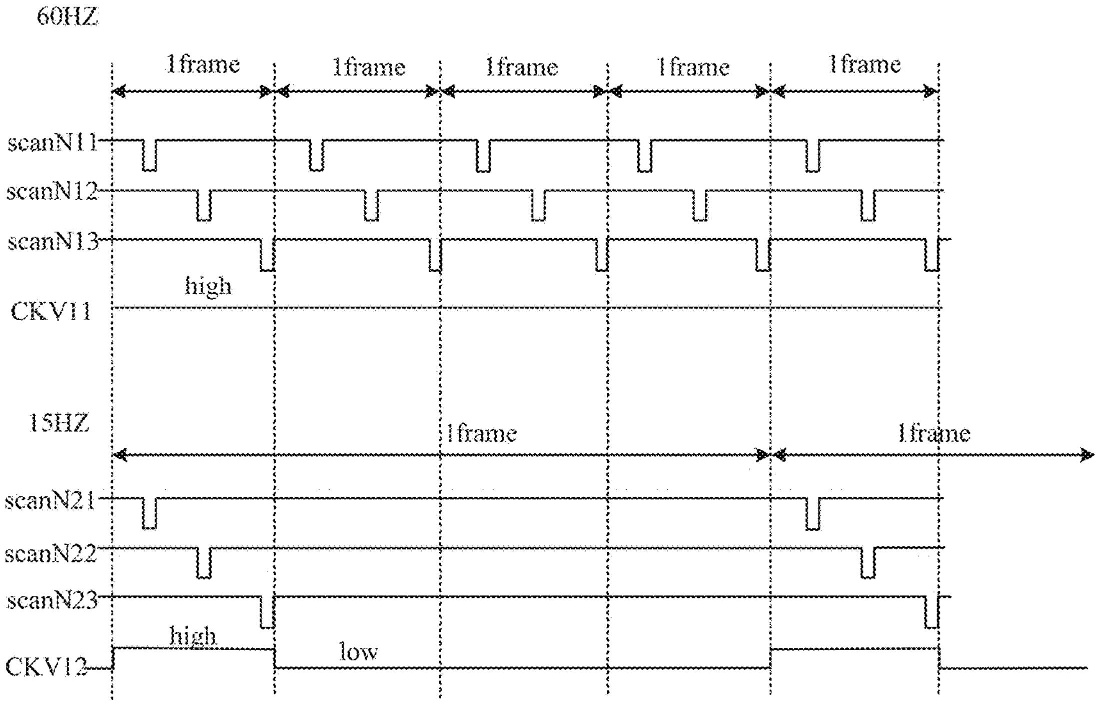
FIG. 4 is a schematic diagram of an output and driving timing of a shift register according to an embodiment of the present disclosure.

FIG. 4 is a schematic diagram of an output and driving timing of a shift register according to an embodiment of the present disclosure, where scanN11, scanN12 and scanN13 represent output signals of the first output terminal NOUT at the first frequency; CKV11 represents a drive signal of the first clock signal terminal CK1 at the first frequency; scanN21, scanN22 and scanN23 represent output signals of the first output terminal NOUT at the second frequency; and CKV12 represents a drive signal of the first clock signal terminal CK1 at the second frequency. In FIG. 4, the first frequency of 60 Hz and the second frequency of 15 Hz are taken as an example. As shown in FIG. 4, in the display stage of the first frequency, the drive signal CKV11 provided by the first clock signal terminal CK1 is kept at a high level. At this time, the first voltage stabilizing transistor, such as the IGZO transistor, is turned on, and the first output terminal NOUT normally outputs a scanN signal. In the display stage of the second frequency, the drive signal CKV12 provided by the first clock signal terminal CK1 includes a high level signal and a low level signal. In a case where the drive signal CKV12 provided by the first clock signal terminal CK1 is a high level signal, at this time, the first voltage stabilizing transistor, such as the IGZO transistor, is turned on, the first output terminal NOUT normally outputs a scanN signal, and the scanN signal in this stage includes a low level signal. In a case where the drive signal CKV12 provided by the first clock signal terminal CK1 is a low level signal, at this time, the first voltage stabilizing transistor, such as the IGZO transistor, is turned off, the first output terminal NOUT normally outputs a scanN signal, and the scanN signal in this stage includes a high level signal.

As a feasible implementation, the display stage of the second frequency may include a first sub-stage and a second sub-stage, and the first sub-stage may correspond to an initialization stage and a data signal writing stage of a pixel circuit. In the first sub-stage, the first voltage stabilizing device is configured to be turned on according to the control signal provided by the first clock signal terminal. In the second sub-stage, the first voltage stabilizing device is configured to be turned off according to the control signal provided by the first clock signal terminal.

The operating stages of the pixel circuit in the display panel may include an initialization stage, a data signal writing stage (threshold compensation stage) and a light emission stage. Since in the initialization stage and the data signal writing stage, an initialization signal and a data signal need to be normally written into a drive transistor in the pixel circuit, it is necessary to ensure that transistors located on write paths of the initialization signal and the data signal in the pixel circuit are turned on. Therefore, in the initialization stage and the data signal writing stage, it is necessary to ensure that the first signal output terminal of the shift register normally outputs the control signal, to ensure the normal writing of the initialization signal and the data signal. Thus, the above first sub-stage may correspond to the initialization stage and the data signal writing stage of the pixel circuit, and the second sub-stage may correspond to the light emission stage of the pixel circuit. In this way, the first clock signal provided by the first clock signal terminal is a clock signal related to the writing of the initialization signal and the data signal, and the normal writing of the initialization signal and the data signal is ensured on the premise that the stable output of the first signal output terminal is ensured. Referring to FIG. 4 correspondingly, the first sub-stage may correspond to the high level period in CKV12 shown in FIG. 4, and the second sub-stage may correspond to the low level period in CKV12 shown in FIG. 4.

On the basis of the above embodiments, with continued reference to FIG. 3, the shift register further includes a second node control device 140, a third node control device 150, a fourth node control device 160, a second output device 170, a storage device 180, a coupling device 190, a shift register signal input terminal IN, a second clock signal terminal CK2, a third clock signal terminal CK3, a fourth clock signal terminal CK4 and a second signal output terminal POUT.

A first input terminal in41 of the second node control device 140 is electrically connected to the second power signal input terminal V2. A first control terminal ctr41 of the second node control device 140 is electrically connected to the first node N1. An output terminal out4 of the second node control device 140 is electrically connected to the second control terminal ctr32 of the first output device 120.

The first input terminal in21 of the first node control device 110 is electrically connected to the first power signal input terminal V1. The second input terminal in22 of the first node control device 110 is electrically connected to the second power signal input terminal V2. The first control terminal ctr21 of the first node control device 110 is electrically connected to the second clock signal terminal CK2. The second control terminal ctr22 of the first node control device 110 is electrically connected to the second signal output terminal POUT.

A first input terminal in51 of the third node control device 150 is electrically connected to the second power signal input terminal V2. A second input terminal in52 of the third node control device 150 is electrically connected to the shift register signal input terminal IN. A first control terminal ctr51 of the third node control device 150, an output terminal out6 of the fourth node control device 160, a first control terminal ctr71 of the second output device 170 and a first terminal c81 of the storage device 180 are connected at a third node N3. A second control terminal ctr52 of the third node control device 150 is electrically connected to the third clock signal terminal CK3. A third control terminal ctr53 of the third node control device 150 is electrically connected to the fourth clock signal terminal CK4. An output terminal out5 of the third node control device 150, a first control terminal ctr61 of the fourth node control device 160, a coupling terminal cp7 of the second output device 170 and a second control terminal ctr72 of the second output device 170 are electrically connected at a fourth node N4.

A first input terminal in61 of the fourth node control device 160 is electrically connected to the shift register signal input terminal IN. A second input terminal in62 of the fourth node control device 160 is electrically connected to the first power signal input terminal V1. A second control terminal ctr62 of the fourth node control device 160 is electrically connected to the third clock signal terminal CK3.

A first input terminal in71 of the second output device 170 is electrically connected to the second power signal input terminal V2. A second input terminal in72 of the second output device 170 is electrically connected to the fourth clock signal terminal CK4. An output terminal out7 of the second output device 170 is electrically connected to the second signal output terminal POUT.

A second terminal c82 of the storage device 180 is electrically connected to the second power signal input terminal V2.

A first terminal c91 of the coupling device 190 is electrically connected to the second node N2, and a second terminal c92 of the coupling device 190 is electrically connected to the first signal output terminal NOUT.

Exemplary, FIG. 3 illustrates a feasible circuit structure of a shift register for describing the embodiment of the present disclosure in detail. The shift register shown in FIG. 3 may output both a scan N signal and a scan P signal for the condition that the pixel circuit includes both an N-type transistor and a P-type transistor, so that it is unnecessary to use two shift registers to respectively output a scan N signal and a scan P signal, and a high degree of functional integration of the shift register is ensured.

Figure 5:
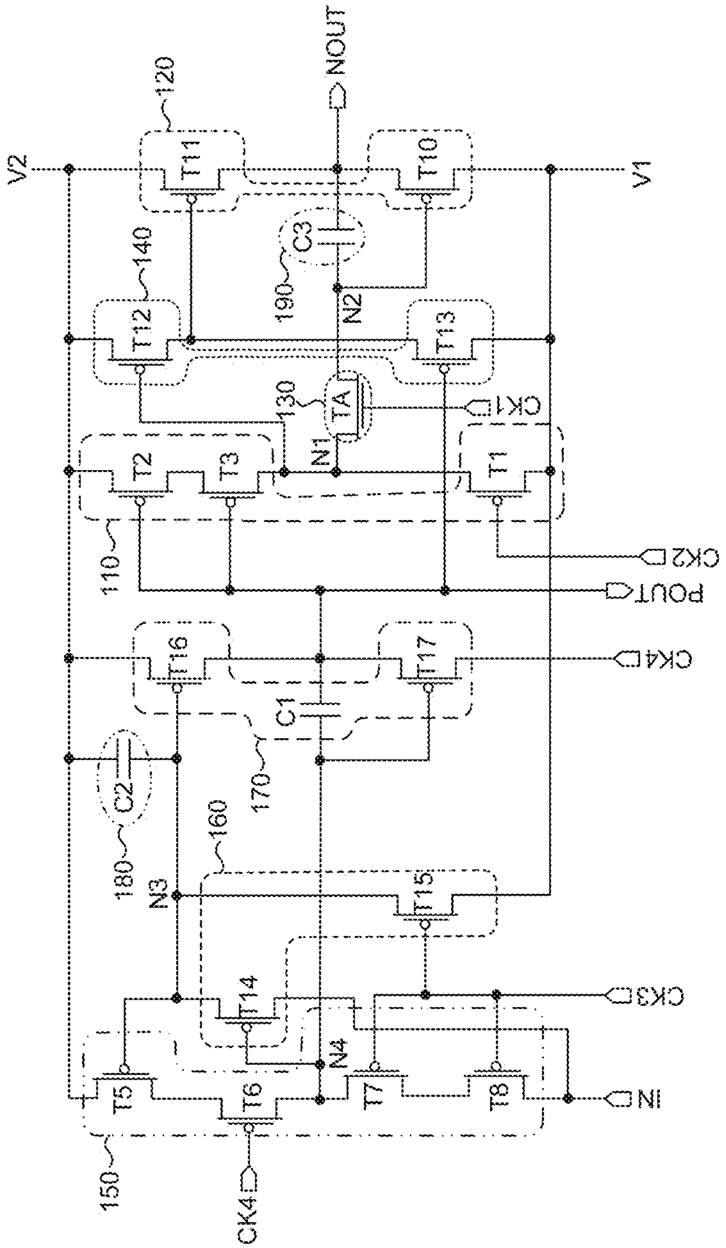
FIG. 5 is a schematic diagram of a circuit of another shift register according to an embodiment of the present disclosure.

FIG. 5 is a schematic diagram of a circuit of another shift register according to an embodiment of the present disclosure. FIG. 5 illustrates the detailed circuit structure of each device in FIG. 3 in a feasible implementation. As shown in FIG. 5, the first node control device 110 includes a first transistor T1, a second transistor T2 and a third transistor T3. A first electrode of the first transistor T1 is the first input terminal in21 of the first node control device 110. A gate of the first transistor T1 is the first control terminal ctr21 of the first node control device 110. A first electrode of the second transistor T2 is the second input terminal in22 of the first node control device 110. A gate of the second transistor T2 and a gate of the third transistor T3 are electrically connected to each other to be the second control terminal ctr22 of the first node control device 110. A second electrode of the second transistor T2 is electrically connected to a first electrode of the third transistor T3. A second electrode of the third transistor T3 and a second electrode of the first transistor T1 are electrically connected to each other to be the output terminal out1 of the first node control device 110.

The first output device 120 includes a tenth transistor T10 and an eleventh transistor T11. A first electrode of the tenth transistor T10 is the first input terminal in31 of the first output device 120. A gate of the tenth transistor T10 is the first control terminal ctr31 of the first output device 120. A first electrode of the eleventh transistor T11 is the second input terminal in32 of the first output device 120. A gate of the eleventh transistor T11 is the second control terminal ctr32 of the first output device 120. A second electrode of the tenth transistor T10 is electrically connected to a second electrode of the eleventh transistor T11 to serve as the output terminal out3 of the first output device 120.

The first voltage stabilizing device 130 may be a first voltage stabilizing transistor TA. A first electrode of a first voltage stabilizing transistor TA is the first terminal in1 of the first voltage stabilizing device 130. A second electrode of the first voltage stabilizing transistor TA is the second terminal out1 of the first voltage stabilizing device 130. A gate of the first voltage stabilizing transistor TA is the control terminal ctrl of the first voltage stabilizing device 130.

The second node control device 140 includes a twelfth transistor T12 and a thirteenth transistor T13. A first electrode of the twelfth transistor T12 is the first input terminal in41 of the second node control device 140. A gate of the twelfth transistor T12 is the first control terminal ctr41 of the second node control device 140. A first electrode of the thirteenth transistor T13 is the second input terminal in42 of the second node control device 140. A gate of the thirteenth transistor T13 is the second control terminal ctr42 of the second node control device 140. A second electrode of the twelfth transistor T12 is electrically connected to a second electrode of the thirteenth transistor T13 to serve as the output terminal out4 of the second node control device 140.

The third node control device 150 includes a fifth transistor T5, a sixth transistor T6, a seventh transistor T7 and an eighth transistor T8. A first electrode of the fifth transistor T5 is the first input terminal in51 of the third node control device 150. A gate of the fifth transistor T5 is the first control terminal ctr51 of the third node control device 150. A second electrode of the fifth transistor T5 is electrically connected to a first electrode of the sixth transistor T6. A gate of the sixth transistor T6 is the third control terminal ctr53 of the third node control device 150. A second electrode of the sixth transistor T6 is electrically connected to a first electrode of the seventh transistor T7 to serve as the output terminal out5 of the third node control device 150. A second electrode of the seventh transistor T7 is electrically connected to a first electrode of the eighth transistor T8. A second electrode of the eighth transistor T8 is the second input terminal in52 of the third node control device 150. A gate of the seventh transistor T7 and a gate of the eighth transistor T8 are electrically connected to each other to be the second control terminal ctr52 of the third node control device 150.

The fourth node control device 160 includes a fourteenth transistor T14 and a fifteenth transistor T15. A first electrode of the fourteenth transistor T14 is the first input terminal in61 of the fourth node control device 160. A gate of the fourteenth transistor T14 is the first control terminal ctr61 of the fourth node control device 160. A first electrode of the fifteenth transistor T15 is the second input terminal in62 of the fourth node control device 160. A gate of the fifteenth transistor T15 is the second control terminal ctr62 of the fourth node control device 160. A second electrode of the fourteenth transistor T14 is electrically connected to a second electrode of the fifteenth transistor T15 to serve as the output terminal out6 of the fourth node control device 160.

The second output device 170 includes a sixteenth transistor T16, a seventeenth transistor T17 and a first capacitor C1. A first electrode of the sixteenth transistor T16 is the first input terminal in71 of the second output device 170. A gate of the sixteenth transistor T16 is the first control terminal ctr71 of the second output device 170. A first electrode of the seventeenth transistor T17 is the second input terminal in72 of the second output device 170. A gate of the seventeenth transistor T17 is the second control terminal ctr72 of the second output device 170. A second electrode of the sixteenth transistor T16, a second electrode of the seventeenth transistor T17 and a second terminal of the first capacitor C1 are electrically connected to serve as the output terminal out7 of the second output device 170. A first terminal of the first capacitor C1 is the coupling terminal of the second output device 170.

The storage device 180 includes a second capacitor C2. A first terminal of the second capacitor C2 is a first terminal 181 of the storage device 180, and a second terminal of the second capacitor C2 is a second terminal 182 of the storage device 180.

The coupling device 190 includes a third capacitor C3. A first terminal of the third capacitor C3 is a first terminal 191 of the coupling device 190, and the second terminal of the second capacitor C3 is a second terminal 192 of the coupling device 190.

FIG. 5 illustrates the detailed circuit structure of the shift register provided by the embodiment of the present disclosure in only one feasible implementation, which is not intended to limit the shift register circuit, and other shift register circuits that can implement corresponding functions are within the scope of the embodiment of the present disclosure. Further, in the detailed circuit structure of the shift register shown in FIG. 5, the second transistor T2 and third transistor T3 in the first node control device 110 may be the structure shown in FIG. 5 or may constitute a dual-gate transistor (not shown in FIG. 5) together, to ensure that the leakage currents of the second transistor T2 and the third transistor T3 are small. Similarly, the seventh transistor T7 and the eighth transistor T8 in the third node control device 110 may be the structure shown in FIG. 5 or may constitute a dual-gate transistor (not shown in FIG. 5) together, to ensure that the leakage currents of the seventh transistor T7 and the eighth transistor T8 are small.

Figure 6:
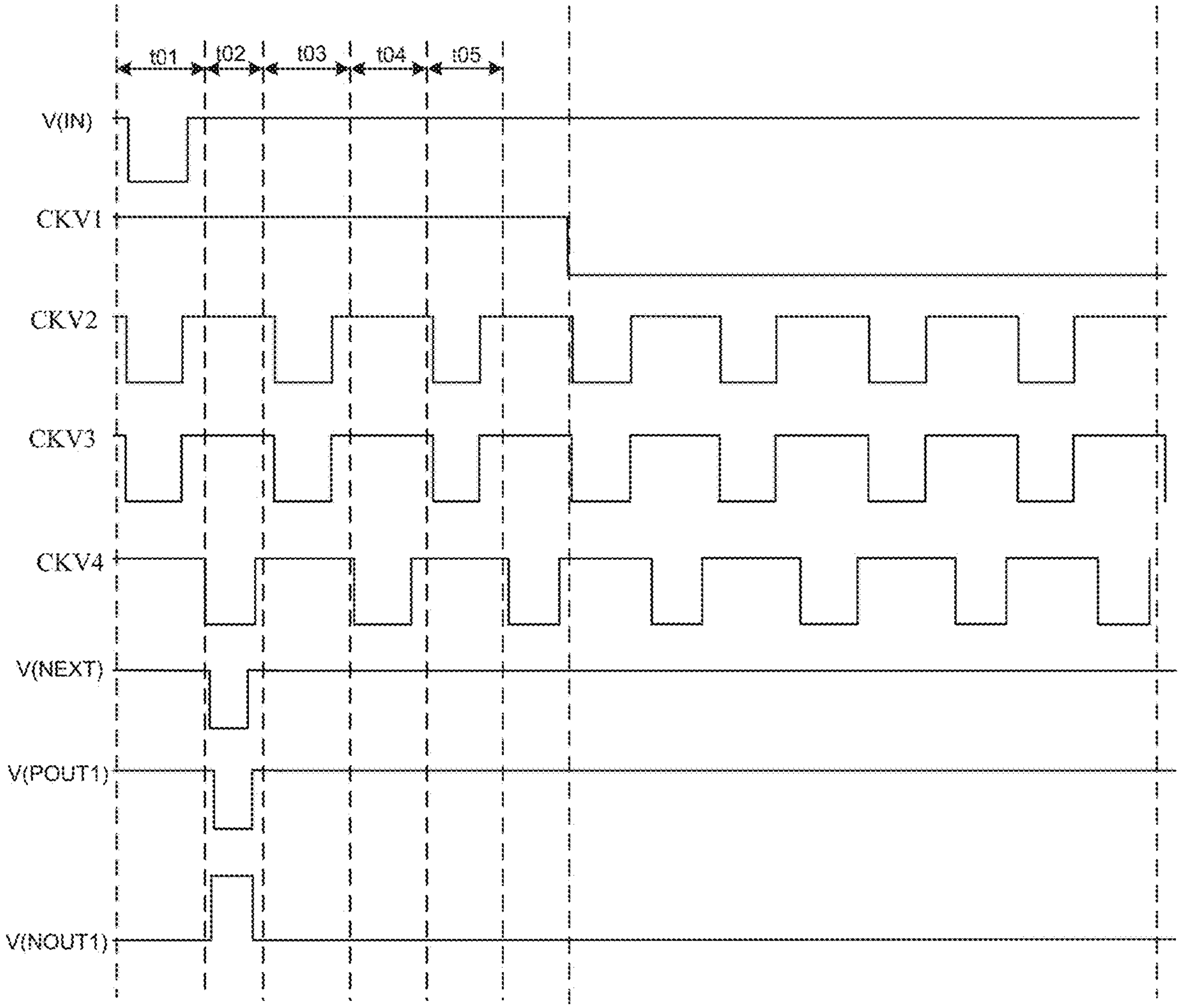
FIG. 6 is a schematic diagram of driving timing of a shift register according to an embodiment of the present disclosure.

FIG. 6 is a schematic diagram of driving timing of a shift register according to an embodiment of the present disclosure, showing the potential of each signal terminal and the potential of each output terminal in different stages. Referring to FIGS. 3, 5 and 6, the operating progress of the shift register provided by the embodiment of the present disclosure is illustrated below. Referring to FIG. 6, V(IN) represents a timing signal of the shift register signal input terminal IN; CKV1 represents a timing signal of the first clock signal terminal CK1; CKV2 represents a timing signal of the second clock signal terminal CK2; CKV3 represents a timing signal of the third clock signal terminal CK3; and CKV4 represents a timing signal of the fourth clock signal terminal CK4. V(NEXT) is a shift signal which is substantially the same as a timing signal V(POUT) of the second signal output terminal POUT, and V(NOUT) represents a timing signal of the first signal output terminal NOUT. The driving timing shown in FIG. 6 is the corresponding driving timing during the displaying of the second frequency (a low frequency). A first stage t01, a second stage t02, a third stage t03, a fourth stage t04 and a fifth stage t05 all correspond to a high level stage of the signal CKV1 input into the first clock signal terminal CK1. At this time, the first voltage stabilizing device 130 is turned on, that is, the first stage t01, the second stage t02, the third stage t03, the fourth stage t04 and the fifth stage t05 all correspond to the initialization stage and the data signal writing stage in the pixel circuit. The stage after the fifth stage t05 corresponds to a low level stage of the signal CKV1 input into the first clock signal input terminal CK1. At this time, the first voltage stabilizing device 130 is turned off, that is, the stage after the fifth stage t05 corresponds to the light emission stage in the pixel circuit.

In the first stage t01, the signal CKV3 input into the third clock signal terminal CK3 is a low level signal, the signal V(IN) input into the shift register signal input terminal IN is a low level signal, and the signal CKV4 input into the fourth clock signal terminal CK4 is a high level signal. At this time, the seventh transistor T7 and the eighth transistor T8 are turned on, and the third node control device 150 transmits the low level signal of the shift register signal input terminal IN to the fourth node N4 through the seventh transistor T7 and the eighth transistor T8. At this time, the gate of the seventeenth transistor T17 is in an enabled state, and the seventeenth transistor T17 is turned on, and the second output device 170 transmits the high level signal input into the fourth clock signal terminal CK4 to the second signal output terminal POUT through the seventeenth transistor T17.

At the same time, the gate of the eighth transistor T8 is also in an enabled state due to the low level signal of the third clock signal terminal CK3, so that the eighth transistor T8 is turned on, and the fourth node control device 160 transmits the low level signal of the first power signal input terminal V1 to the first node N1 through the eighth transistor T8. At this time, the gate of the sixteenth transistor T16 is in an enabled state, and the sixteenth transistor T16 is turned on, and the second output device 170 transmits the high level signal of the second power signal input terminal V2 to the second signal output terminal POUT through the sixteenth transistor T16. In summary, the second signal output terminal POUT outputs a high level signal.

On this basis, since the gate signal of the second transistor T2 and the gate signal of the third transistor T3 are high level signals of the second signal output terminal POUT, the second transistor T2 and the third transistor T3 are in a turned-off state.

In the first stage t01, the second clock signal terminal CK2 has a low level signal, the first transistor T1 is turned on, the first node control device 120 transmits the low level signal of the first power signal input terminal V1 to the first node N1 through the first transistor T1, so that the first node N1 is at a low potential. At this time, the tenth transistor T10 is turned on, and the first output device 120 transmits the low level signal of the first power signal input terminal V1 to the first signal output terminal NOUT through the tenth transistor T10.

At the same time, since the first node N1 is at a low potential, the twelfth transistor T12 is turned on, and the second node control device 140 outputs the high level signal of the second power signal input terminal V2 through the twelfth transistor T12. At this time, the gate of the eleventh transistor T11 has a high level signal, and the eleventh transistor T11 is turned off, so that the first output device 120 does not transmit the high level signal of the second power signal input terminal V2. In summary, the first signal output terminal NOUT outputs a low level signal.

Thus, in the first stage t01, the second signal output terminal POUT outputs a high level signal and the first signal output terminal NOUT outputs a low level signal.

In the second stage t02, the signal CKV3 input into the third clock signal terminal CK3 is a high level signal, the signal V(IN) input into the shift register signal input terminal IN is a high level signal, and the signal CKV4 input into the fourth clock signal terminal CK4 is a low level signal. At this time, the seventh transistor T7, the eighth transistor T8 and the fifteenth transistor T15 are turned off, and the third node control device 150 stops transmitting a low potential signal to the fourth node N4. However, since the first capacitor C1 has the function of maintaining a potential, a low potential is maintained at the fourth node N4. At this time, the gate of the fourteenth transistor T14 is in an enabled state, and the fourth node control device 160 transmits the high level signal of the shift register signal input terminal IN to the third node N3 through the fourteenth transistor T14. The potential of the third node N3 becomes a high potential, and the sixteenth transistor T16 is turned off. At the same time, the gate potential of the seventeenth transistor T17 is kept as the low potential of the fourth node N4, and the seventeenth transistor T17 is turned on, and the second output device 170 transmits the low level signal of the fourth clock signal terminal CK4 to the second signal output terminal POUT through the seventeenth transistor T17. On this basis, since the fourth node N4 is suspended, the coupling effect of the first capacitor C1 is considered. When the second signal output terminal POUT transitions from a high level to a low level, a charge coupling amount is generated, and the charge coupling amount is also coupled to the fourth node N4, so that the potential of the fourth node N4 becomes lower from the low potential in the first stage. Thus, the transmission channel controlled by the fourth node N4 in the second output device 170, that is, the seventeenth transistor T17, can be completely turned on, so that the low level of the fourth clock signal terminal CK4 can be completely transmitted to the second signal output terminal POUT.

On this basis, the gate potential of the second transistor T2 and the gate potential of the third transistor T3 are low potentials, the second transistor T2 and the third transistor T3 are turned on, and the first node control device 110 transmits the high level signal of the second power signal input terminal V2 to the first node N1 through the second transistor T2 and the third transistor T3. Then, the potential of the first node N1 becomes high, so that the gate potential of the tenth transistor T10 is a high potential, and the tenth transistor T10 is turned off, i.e., locked.

At the same time, the second signal output terminal POUT is at a low level, that is, the gate potential of the thirteenth transistor T13 is a low potential, the thirteenth transistor T13 is turned on, and the second node control device 140 outputs the low level signal of the first power signal input terminal V1 through the thirteenth transistor T13. At this time, the gate of the eleventh transistor T11 is in an enabled state, and the eleventh transistor T11 is turned on, and the first output device 120 transmits the high level signal of the second power signal input terminal V2 to the first signal output terminal NOUT through the eleventh transistor T11.

Thus, in the second stage t02, the second signal output terminal POUT outputs a low level signal and the first signal output terminal NOUT outputs a high level signal.

In the third stage t03, the signal CKV3 input into the third clock signal terminal CK3 is a low level signal, and the signal V(IN) input into the shift register signal input terminal IN is a high level signal. At this time, the seventh transistor T7 and the eighth transistor T8 are turned on, and the third node control device 150 transmits the high level signal of the shift register signal input terminal IN to the fourth node N4 through the seventh transistor T7 and the eighth transistor T8. At this time, the gate of the fourteenth transistor T14 and the gate of the seventeenth transistor T17 are both in a disenabled state, that is, the fourteenth transistor T14 and the seventeenth transistor T17 are both turned off. The gate of the fifteenth transistor T15 is in an enabled state, and the fifteenth transistor T15 is turned on, and the fourth node control device 120 transmits the low level signal of the first power signal input terminal V1 to the third node N3 through the fifteenth transistor T15. At this time, the gate potential of the sixteenth transistor T16 is a low potential, the sixteenth transistor T16 is turned on, and the second output device 170 transmits the high level signal of the second power signal input terminal V2 to the second signal output terminal POUT through the sixteenth transistor T16.

On this basis, the gate of the second transistor T2 and the gate of the third transistor T3 are in a disenabled state, and the second transistor T2 and the third transistor T3 are turned off.

At the same time, the signal CKV1 input into the first clock signal terminal CK1 is a low level signal, the gate of the first transistor T1 is in a low potential state, the first transistor T1 is turned on, and the first node control device 110 transmits the low level signal of the first power signal input terminal V1 to the first node N1 through the first transistor T1. Then, the gate of the twelfth transistor T12 and the gate of the tenth transistor T10 are both in an enabled state, the second node control device 140 outputs the high level signal of the second power signal input terminal V2 through the twelfth transistor T12, so that the gate potential of the twelfth transistor T12 is a high potential, the twelfth transistor T12 is turned off, and the first output device 120 transmits the low level signal of the first power signal input terminal V1 to the first signal output terminal NOUT through the tenth transistor T10.

In combination with potential information of the first signal output terminal NOUT in the second stage, on the basis of the second stage, when the output signal of the first signal output terminal NOUT transitions from a high level to a low level, a charge coupling amount is generated. Based on the coupling effect of the coupling device 190, the charge coupling amount may be coupled to the other terminal of the third capacitor C3, i.e. to the first node N1, and thus the potential of the first node N1 becomes lower from the potential of the second stage, that is, the gate potential of the tenth transistor T10 becomes lower from the low potential of the second stage. Furthermore, the tenth transistor T10 in the first output device 120 is completely opened, that is, the signal transmission channel formed by the tenth transistor T10 can be completely turned on, so that the low level of the first power signal input terminal V1 can be completely transmitted out to the first signal output terminal NOUT without a potential loss.

Thus, in the third stage t03, the second signal output terminal POUT outputs a high level signal and the first signal output terminal NOUT outputs a low level signal.

In the fourth stage t04, the signal CKV3 input into the third clock signal terminal CK3 is a high level signal, and the signal V(IN) input into the shift register signal input terminal IN is a high level signal. At this time, the gate of the seventh transistor T7, the gate of the eighth transistor T8 and the gate of the fifteenth transistor T15 are all in a disenabled state, the seventh transistor T7, the eighth transistor T8 and the fifteenth transistor T15 are all turned off, and the fourth node control device 160 cannot transmit the low level signal of the first power signal input terminal V1. At this time, since the storage device 180 has a function of maintaining a potential, the third node N3 may be kept at a low level. Then, the gate of the fifth transistor T5 is at a low potential, and the fifth transistor T5 is turned on. At the same time, the gate potential of the sixth transistor T6, that is, the signal CKV4 input into the fourth clock signal terminal CK4, is a low level signal, so that the sixth transistor T6 is turned on. Therefore, the third node control device 130 transmits the high level signal of the second power signal input terminal V2 to the fourth node N4 through the fifth transistor T5 and the sixth transistor T6, and the potential of the fourth node N4 becomes a high potential. At this time, the gate potential of the seventeenth transistor T17 is a high potential, and the seventeenth transistor T17 is turned off.

At the same time, since the third node N3 is kept at a low level, and the gate of the sixteenth transistor T16 is in an enabled state, the sixteenth transistor T16 is turned on, and the second output device 170 transmits the high level signal of the second power signal input terminal V2 to the second signal output terminal POUT through the sixteenth transistor T16.

At the same time, the potential of the first node N1 maintains a low level state depending on the coupling device 190, and the first signal output terminal NOUT continuously outputs the low level signal of the first power signal input terminal V1.

In addition, since the first node N1 is at a low potential, the twelfth transistor T12 is turned on, and the second node control device 140 outputs the high level signal of the second power signal input terminal V2 through the twelfth transistor T12, so that the gate of the eleventh transistor T11 is in a disenabled state, and the eleventh transistor T11 is turned off. Thus, in the fourth stage t04, the second signal output terminal POUT outputs a high level signal and the first signal output terminal NOUT outputs a low level signal.

The operating state of the fifth stage t05 is the same as the operating stage of the third stage. Thus, in the fifth stage t05, the second signal output terminal POUT outputs a high level signal and the first signal output terminal NOUT outputs a low level signal.

Therefore, it is implemented that the scan P signal and the scan N signal are simultaneously output, which is applied to the pixel circuit including both the P-type transistor and the N-type transistor, and the simple structure of the shift register circuit is ensured.

It should be noted that V (POUT1) and V (NOUT1) shown in FIG. 6 are the above-mentioned scan P signal and scan N signal, and V (POUT1) and V (NOUT1) in the figures described below are the above-mentioned scan P signal and scan N signal, which is not repeated here.

Figure 7:
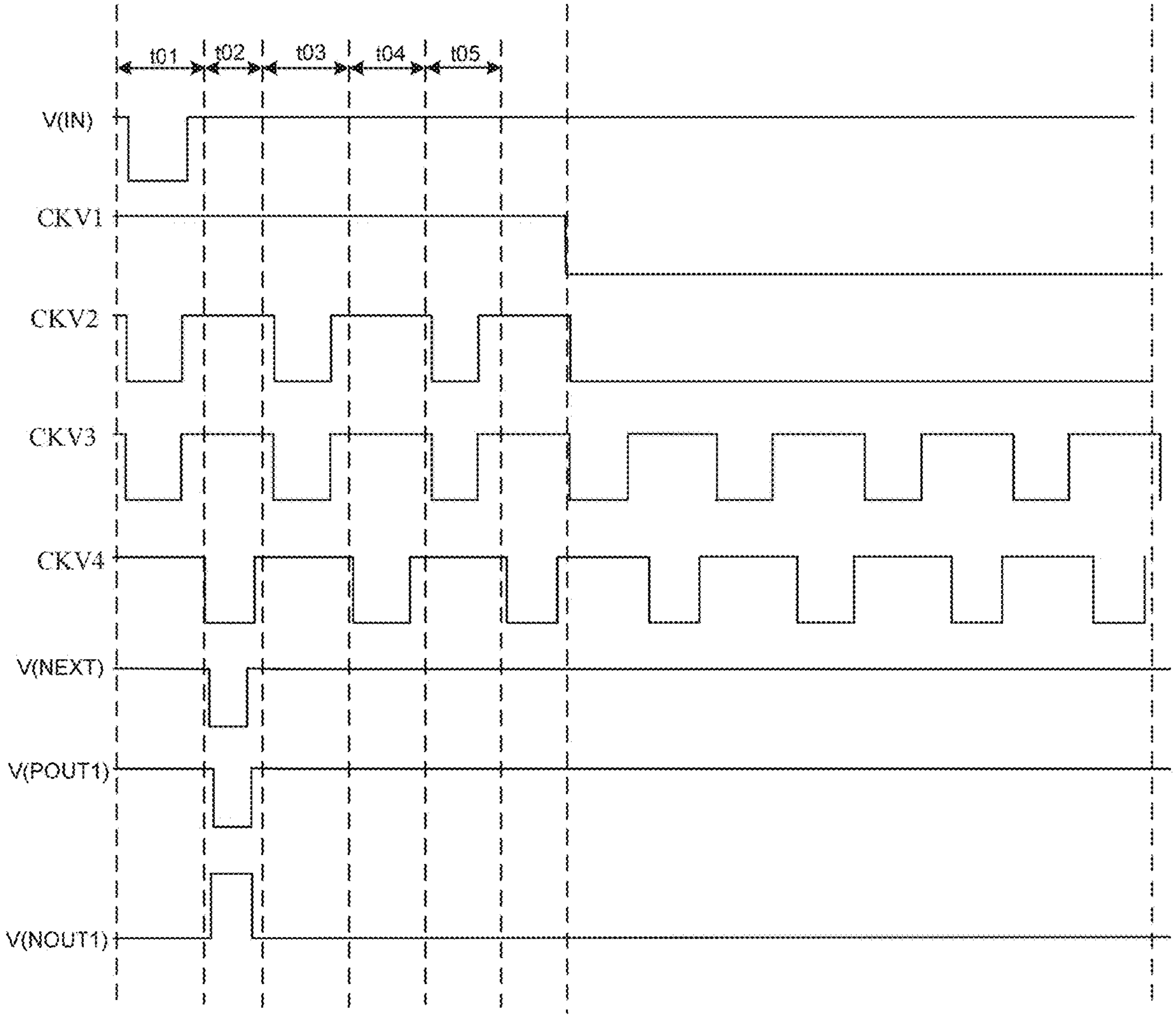
FIG. 7 is a schematic diagram of driving timing of another shift register according to an embodiment of the present disclosure.

On the basis of the above embodiments, FIG. 7 is a schematic diagram of driving timing of another shift register according to an embodiment of the present disclosure. Referring FIGS. 6 and 7, the shift register may further include the second node control device 140 and the second clock signal terminal CK2. The first input terminal in41 of the second node control device 140 is electrically connected to the second power signal input terminal V2. The first control terminal ctr41 of the second node control device 140 is electrically connected to the first node N1. The output terminal out4 of the second node control device 140 is electrically connected to the second control terminal ctr32 of the first output device 120. The first input terminal in21 of the first node control device 110 is electrically connected to the first power signal input terminal V1. The first control terminal ctr21 of the first node control device 110 is electrically connected to the second clock signal terminal CK2. In a low level output stage of the first signal output terminal NOUT, a low level signal is input into the second clock signal terminal CK2.

Exemplary, in the low level output stage of the first signal output terminal NOUT, the second node N2 is kept at a low level, the tenth transistor T10 is turned on, and the first power signal terminal V1 writes a low level signal into the first output terminal NOUT through the turned-on tenth transistor T10 to ensure the low level output of the first signal output terminal NOUT. When the low level output stage of the first signal output terminal NOUT corresponds to a turned-off stage of the first voltage stabilizing device 130, that is, the low level output stage of the first signal output terminal NOUT corresponds to a low level stage of a timing signal CKV1 output by the first clock signal terminal CK1, a timing signal CKV2 input into the second clock signal terminal CK2 may be set to be kept at a low level. Thus, the first transistor T1 is ensured to be turned on, and the low level signal input into the first power signal terminal V1 is written into the first node N1, so that the fifteenth transistor T15 in the second node control device 140 is turned on, the high level signal of the second power signal terminal V2 is output through the turned-on fifteenth transistor T15, and the sixteenth transistor T16 in the first output device 120 is controlled to be turned off. Therefore, the high level signal of the second power signal terminal V2 cannot be transmitted to the first signal output terminal NOUT, and the first signal output terminal NOUT maintains the low level output. When the low level output stage of the first signal output terminal NOUT corresponds to the low level stage of the timing signal CKV1 output by the first clock signal terminal CK1, the second clock signal terminal CK2 is configured to output a low level signal instead of frequently inputting a high level signal and a low level signal in a high-to-low level transition manner, so that the power consumption of the driver chip can be reduced, and the power consumption of the whole display device can be reduced.

On the basis of the above embodiments, with continued reference to FIGS. 3 and 5, the shift register further includes the second signal output POUT. The second input terminal in22 of the first node control device 110 is electrically connected to the second power signal input terminal V2. The second control terminal ctr22 of the first node control device 110 is electrically connected to the second signal output terminal POUT. Further, the first node control device 110 includes the first transistor T1, the second transistor T2 and the third transistor T3. The first electrode of the first transistor T1 is the first input terminal in21 of the first node control device 110. The gate of the first transistor T1 is the first control terminal ctr21 of the first node control device 110. The first electrode of the second transistor T2 is the second input terminal in22 of the first node control device 110. The gate of the second transistor T2 and the gate of the third transistor T3 are electrically connected to each other to be the second control terminal ctr22 of the first node control device 110. The second electrode of the second transistor T2 is electrically connected to the first electrode of the third transistor T3. The second electrode of the third transistor T3 and the second electrode of the first transistor T1 are electrically connected to each other to be the output terminal out2 of the first node control device 110. The connection relationships and operating processes of the above devices are described in detail in the foregoing embodiments and will not be repeated here.

Further, the first terminal of the first voltage stabilizing device 130 is electrically connected to the second electrode of the first transistor T1, and the second terminal of the first voltage stabilizing device 130 is electrically connected to the second node N2. Since the second electrode of the first transistor T1 is electrically connected to the first node N1, that is, the first voltage stabilizing device 130 is directly disposed in series between the first node N1 and the second node N2, the potential of the second node N2 is stabilized by the first voltage stabilizing device 130, to ensure that the signal of the first control terminal ctr31 of the first output device 120 connected to the second node N2 is stable, and the low level signal input into the first power signal terminal V1 is stably output to the first signal output terminal NOUT, and the stable output of the first signal output terminal NOUT is ensured.

Figure 8:
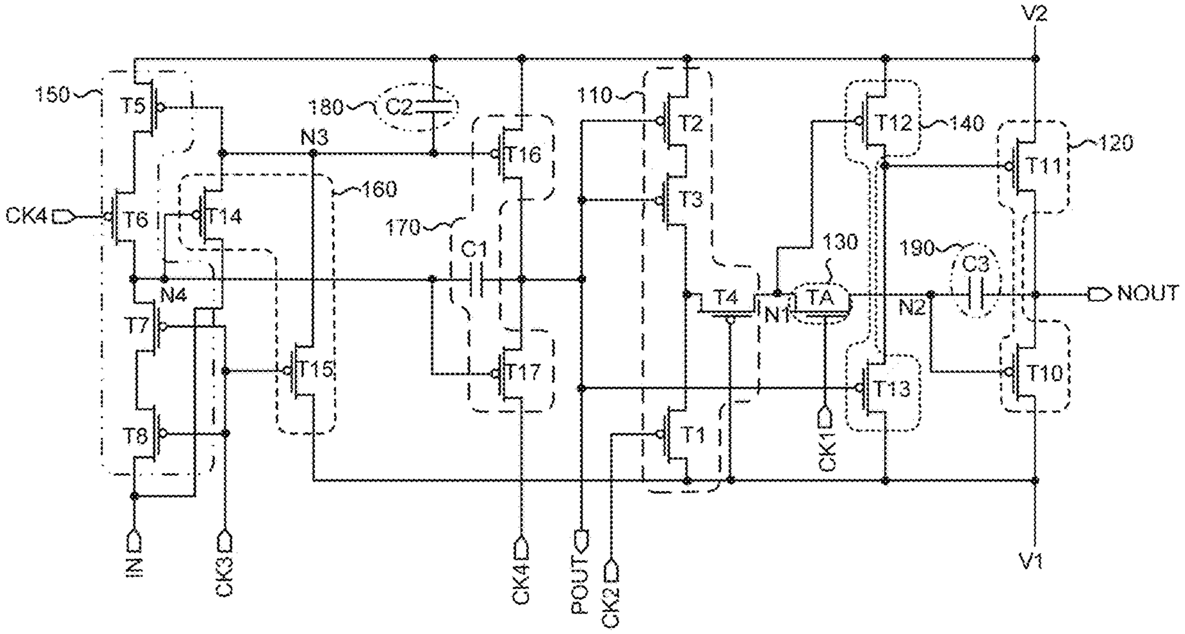
FIG. 8 is a structural diagram of another shift register according to an embodiment of the present disclosure.
Figure 9:
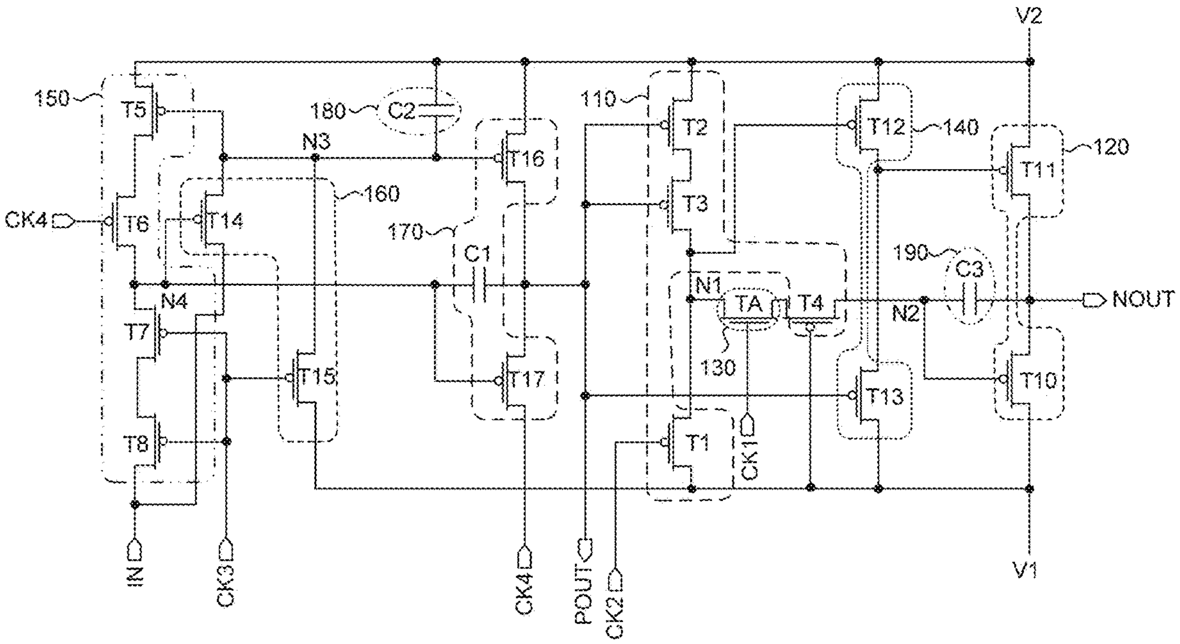
FIG. 9 is a structural diagram of another shift register according to an embodiment of the present disclosure.

As a feasible implementation, FIG. 8 is a structural diagram of another shift register according to an embodiment of the present disclosure, and FIG. 9 is a structural diagram of another shift register according to an embodiment of the present disclosure. Referring to FIGS. 3, 8 and 9, the first node control device 110 further includes a fourth transistor T4. A first electrode of the fourth transistor T4 is electrically connected to the second electrode of the first transistor T1; a second electrode of the fourth transistor T4 serves as the output terminal out1 of the first node control device 110 to be electrically connected to the first terminal of the first voltage stabilizing device 130; and the second terminal of the first voltage stabilizing device 130 is electrically connected to the second node N2 (as shown in FIG. 8). In one embodiment, the first terminal of the first voltage stabilizing device 130 is electrically connected to the second electrode of the first transistor T1, the second terminal of the first voltage stabilizing device 130 is electrically connected to the first electrode of the fourth transistor T4, and the second electrode of the fourth transistor T4 is electrically connected to the second node N2. A gate of the fourth transistor T4 is electrically connected to the first power signal input terminal V1.

Exemplary, in the shift register of the embodiment of the present disclosure, the first node control device 110 may further include the fourth transistor T4, and the fourth transistor T4 is a P-type transistor. The gate of the fourth transistor T4 is electrically connected to the first power signal input terminal V1, and the fourth transistor T4 is a normally-on transistor. The fourth transistor T4 may be disposed in series between the second electrode of the first transistor T1 and the first voltage stabilizing device 130 or may be disposed in series between the first voltage stabilizing device 130 and the second node N2, which is not limited by the embodiment of the present disclosure. The fourth transistor T4 serves as a normally-on transistor, so that the potential of the second node N2 is not affected by the first node N1. Even the leakage current exists in the first transistor T1, the second transistor T2 and the third transistor T3, then the potential of the first node N1 is raised, but the fourth transistor T4 can block the potential. Therefore, it can be ensured that the potential of the second node N2 is kept unchanged, so that the transmission channel controlled by the first control terminal ctr31 of the first output device 120 is not affected, and the first signal output terminal NOUT can output the low level signal of the first power signal input terminal V1, which is conducive to ensuring that the low level of the first signal output terminal NOUT keeps stable. In an embodiment, the fourth transistor T4 may be disposed in series between the second electrode of the first transistor T1 and the first voltage stabilizing device 130, so it can be ensured that the potential of the first terminal of the first voltage stabilizing device 130 is stable, the leakage current between the second node N2 and the first node N1 is further avoided, and it is ensured that the first signal output terminal NOUT can output the low level signal of the first power signal input terminal V1, which is conducive to ensuring that the low level of the first signal output terminal NOUT keeps stable.

Figure 10:
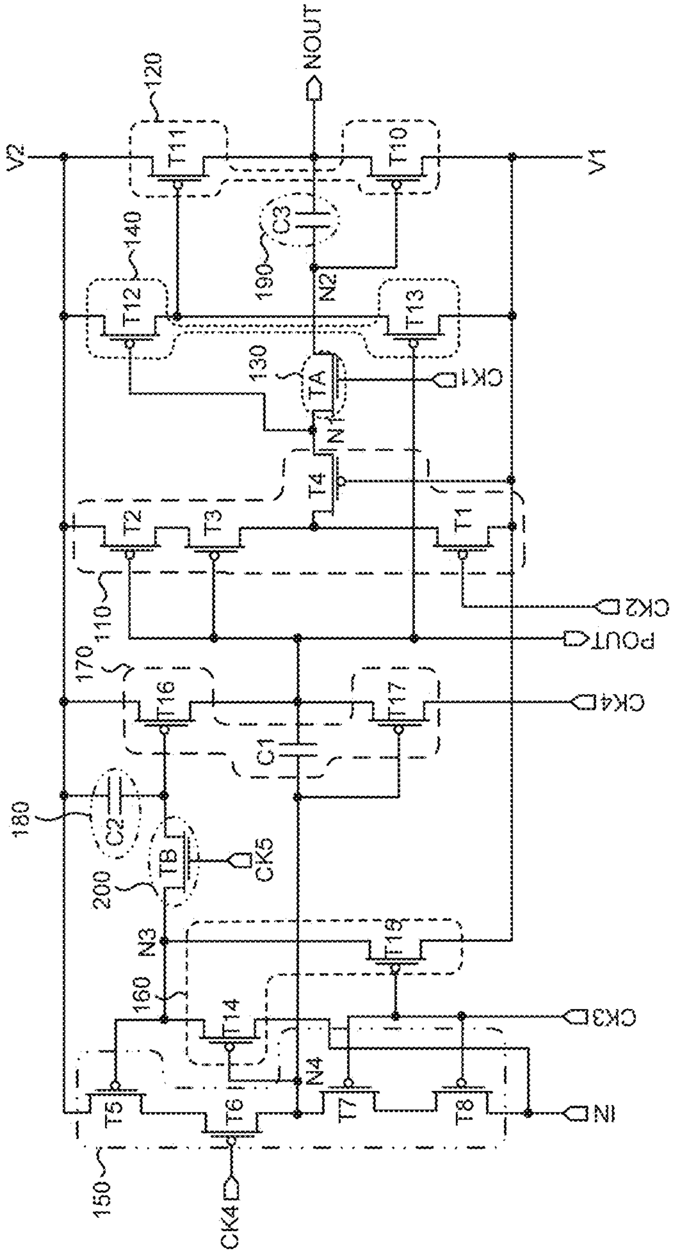
FIG. 10 is a structural diagram of another shift register according to an embodiment of the present disclosure.
Figure 11:
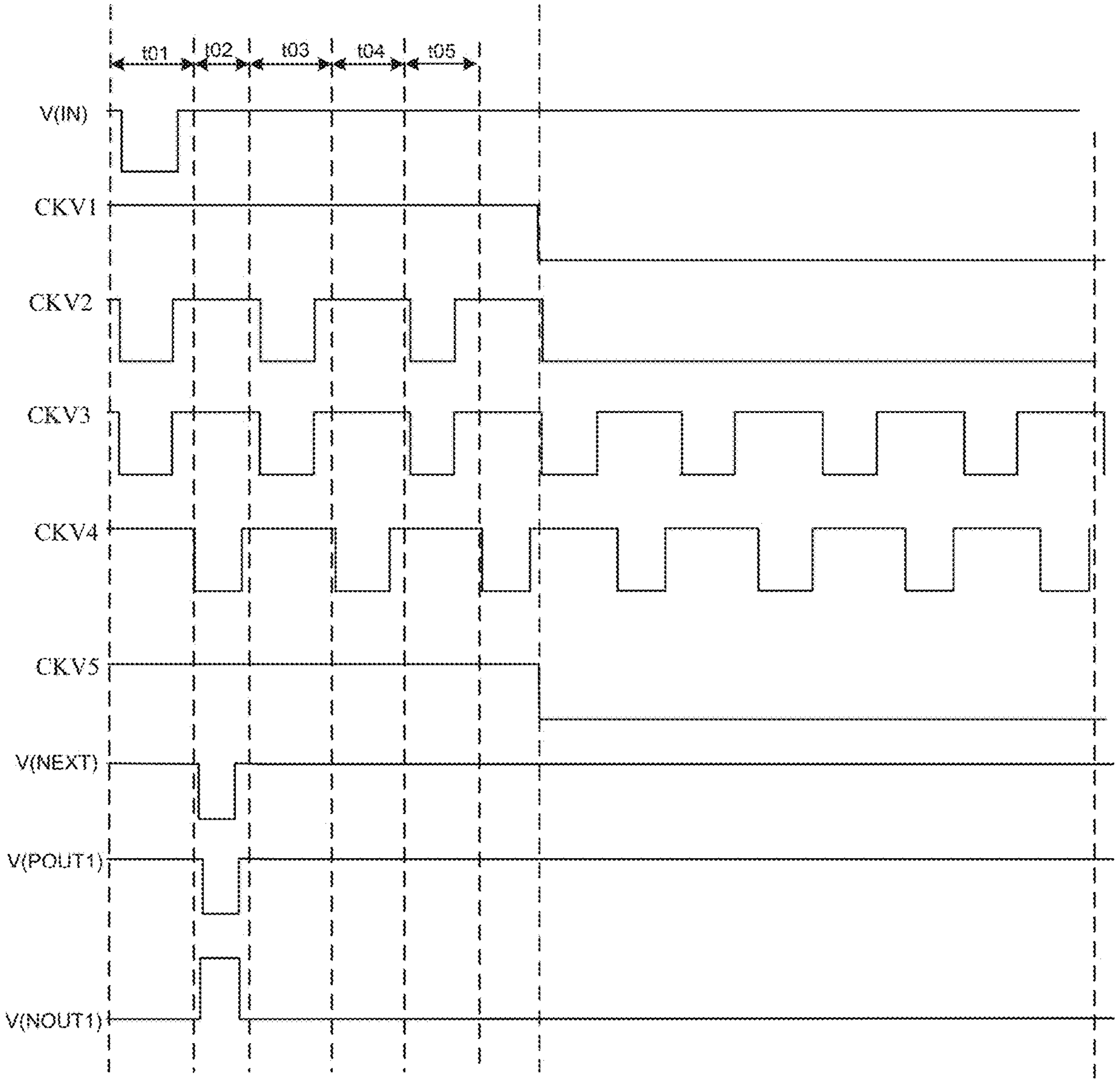
FIG. 11 is a schematic diagram of driving timing of another shift register according to an embodiment of the present disclosure.

On the basis of the above embodiments, FIG. 10 is a structural diagram of another shift register according to an embodiment of the present disclosure, and FIG. 11 is a schematic diagram of driving timing of another shift register according to an embodiment of the present disclosure. Referring to FIGS. 3, 10 and 11, the shift register further includes the third node control device 150, a second voltage stabilizing device 200, the second output device 170, the second signal output terminal POUT and a fifth clock signal terminal CK5. The first input terminal in51 of the third node control device 150 is electrically connected to the second power signal input terminal V2. The first control terminal ctr51 of the third node control device 150 is electrically connected to a first terminal of the second voltage stabilizing device 200 at the third node N3. A second terminal of the second voltage stabilizing device 200 is electrically connected to the first control terminal ctr71 of the second output device 170. A control terminal of the second voltage stabilizing device 200 is electrically connected to the fifth clock signal terminal CK5. In the display stage of the first frequency, the second voltage stabilizing device 200 is configured to be turned on according to a control signal CKV5 provided by the fifth clock signal terminal. In the display stage of the second frequency, the second voltage stabilizing device 200 is configured to be turned on or turned off according to a control signal CKV5 provided by the fifth clock signal terminal.

Exemplary, in a high level output stage maintained at the second signal output terminal POUT, which is similar to the foregoing stage t03, the gate potential of the sixteenth transistor T16 is a low potential, the sixteenth transistor T16 is turned on, and the second output device 170 transmits the high level signal of the second power signal input terminal V2 to the second signal output terminal POUT through the sixteenth transistor T16. In order to ensure that the gate signal of the sixteenth transistor T16 is stable, according to the embodiment of the present disclosure, the second voltage stabilizing device 200 and the fifth clock signal terminal CK5 are added, and the second voltage stabilizing device 200 has the characteristic of a small leakage current. The first terminal of the second voltage stabilizing device 200 is electrically connected to the first control terminal ctr51 of the third node control device 150; the second terminal of the second voltage stabilizing device 200 is electrically connected to the first control terminal ctr71 of the second output device 170; and the control terminal of the second voltage stabilizing device 200 is electrically connected to the fifth clock signal terminal CK5. In the display stage of the first frequency (a high frequency), the second voltage stabilizing device 200 is turned on under the action of the control signal CKV5 provided by the fifth clock signal terminal CK5. Since the display refreshing frequency is high and the leakage current of the second voltage stabilizing device 130 is small, the gate potential of the sixteenth transistor T16 is stable and cannot be raised due to the leakage currents of other transistors. Therefore, it is ensured that the high potential signal of the second power signal terminal V2 can be stably transmitted to the second signal output terminal POUT. In the display stage of the second frequency (a low frequency), the second voltage stabilizing device 200 is turned on or turned off under the action of the clock signal CKV5 provided by the fifth clock signal terminal CK5. When the second voltage stabilizing device 200 is turned off, the transmission path of the leakage current between the gate of the sixteenth transistor T16 and another transistor is blocked, and the gate potential of the sixteenth transistor T16 is not raised, to ensure that the high potential signal of the second power signal terminal V2 can be stably transmitted to the second signal output terminal POUT. Even the second voltage stabilizing device 200 is turned on, since the leakage current of the second voltage stabilizing device 200 is small, the raise of the gate potential of the sixteenth transistor T16 is limited. Therefore, it can also be ensured that the high potential signal of the second power signal terminal V2 can be stably transmitted to the second signal output terminal POUT, the normal display of the display panel driven by the stable scan P signal is ensured, and the flickering cannot occur.

Further, with continued reference to FIG. 10, the second voltage stabilizing device 200 may be a second voltage stabilizing transistor TB. The second voltage stabilizing transistor TB may be an oxide semiconductor transistor, such as the IGZO transistor. The oxide semiconductor transistor is an N-type transistor with high stability and a small leakage current. Even in the display stage of the low frequency, when the oxide semiconductor transistor is turned on, the leakage current of the oxide semiconductor transistor can be ignored compared with the leakage current of the LTPS transistor, so that the raise of the gate potential of the sixteenth transistor T16 is limited and the stable output of the second signal output terminal POUT is not affected.

As a feasible implementation, the display stage of the second frequency may include a first sub-stage and a second sub-stage, and the first sub-stage may correspond to the initialization stage and the data signal writing stage of the pixel circuit. In the first sub-stage, the second voltage stabilizing device 200 is configured to be turned on according to the control signal CKV5 provided by the fifth clock signal terminal CK5. In the second sub-stage, the second voltage stabilizing device 200 is configured to be turned off according to the control signal CKV5 provided by the fifth clock signal terminal CK5.

The operating stages of the pixel circuit in the display panel may include an initialization stage, a data signal writing stage (threshold compensation stage) and a light emission stage. Since in the initialization stage and the data signal writing stage, an initialization signal and a data signal need to be normally written into a drive transistor in the pixel circuit, it is necessary to ensure that the transistors located on write paths of the initialization signal and the data signal in the pixel circuit are turned on. Therefore, in the initialization stage and the data signal writing stage, it is necessary to ensure that the second signal output terminal of the shift register normally outputs the control signal, to ensure the normal writing of the initialization signal and the data signal. Thus, the above first sub-stage may correspond to the initialization stage and the data signal writing stage of the pixel circuit, and the second sub-stage may correspond to the light emission stage of the pixel circuit. In this way, the second clock signal provided by the second clock signal terminal is a clock signal related to the writing of the initialization signal and the data signal, and the normal writing of the initialization signal and the data signal is ensured on the premise that the stable output of the second signal output terminal is ensured.

Figure 12:
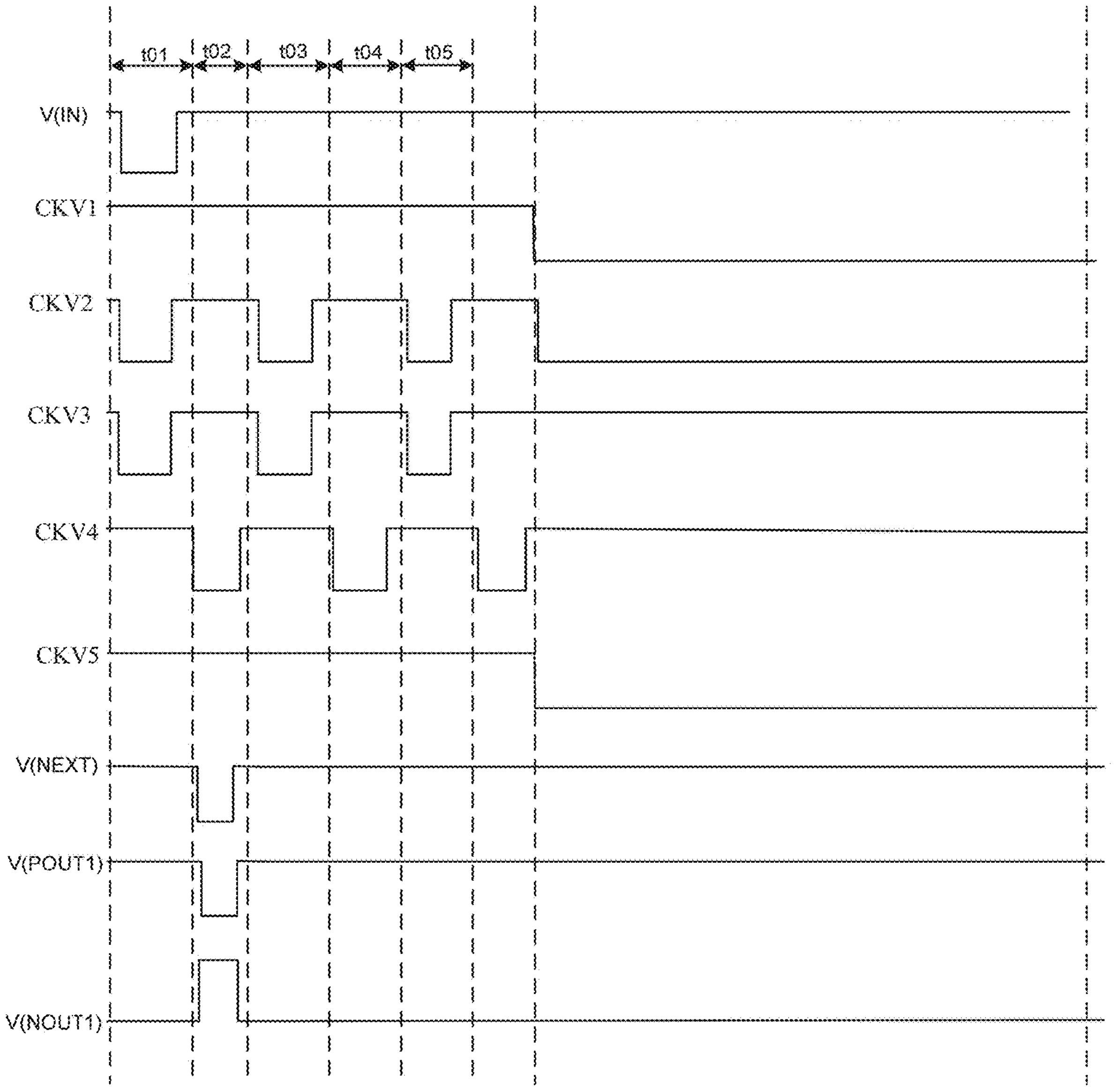
FIG. 12 is a schematic diagram of driving timing of another shift register according to an embodiment of the present disclosure.

FIG. 12 is a schematic diagram of driving timing of another shift register according to an embodiment of the present disclosure. Referring to FIGS. 3, 10 and 12, the shift register further includes the fourth node control device 160, the shift register signal input terminal IN, the third clock signal terminal CK3 and the fourth clock signal terminal CK4. The second input terminal in52 of the third node control device 150 is electrically connected to the shift register signal input terminal IN. The second control terminal ctr62 of the fourth node control device 160 is electrically connected to the third clock signal terminal CK3. The third control terminal ctr53 of the third node control device 150 is electrically connected to the fourth clock signal terminal CK4. The output terminal out5 of the third node control device 150, the first control terminal ctr61 of the fourth node control device 160 and the second control terminal ctr71 of the second output device 170 are electrically connected at the fourth node N4. The first input terminal in61 of the fourth node control device 160 is electrically connected to the shift register signal input terminal IN. The second input terminal in62 of the fourth node control device 160 is electrically connected to the first power signal input terminal V1. The second control terminal ctr62 of the fourth node control device 160 is electrically connected to the third clock signal terminal CK3. The output terminal out6 of the fourth node control device 160 is electrically connected to the third node N3. The first input terminal in71 of the second output device 170 is electrically connected to the second power signal input terminal V2, the second input terminal in72 of the second output device 170 is electrically connected to the fourth clock signal terminal CK4, and the output terminal out7 of the second output device 170 is electrically connected to the second signal output terminal POUT. In the high level output stage of the second signal output terminal, a high level signal is input into both the third clock signal terminal CK3 and the fourth clock signal terminal CK4.

Exemplary, in the high level output stage of the second signal output terminal POUT, the gate potential of the sixteenth transistor T16 is a low potential, the sixteenth transistor T16 is turned on, and the second output device 170 transmits the high level signal of the second power signal input terminal V2 to the second signal output terminal POUT through the sixteenth transistor T16, to ensure the high level output of the second signal output terminal POUT. When the low level output stage of the second signal output terminal POUT corresponds to a turned-off stage of the second voltage stabilizing device 200, that is, the low level output stage of the second signal output terminal POUT corresponds to a low level stage of a timing signal CKV5 output by the fifth clock signal terminal CK5, the third clock signal terminal CK3 and the fourth clock signal terminal CK4 may be both configured to keep the output of a high level signal. Thus, the sixteenth transistor T16 is ensured to be turned on, the high level signal of the second power signal terminal V2 is output by the turned-on sixteenth transistor, and the second signal output terminal POUT maintains the high level output. The high level output stage of the second signal output terminal POUT corresponds to the low level stage of the timing signal CKV1 output by the first clock signal terminal CK1, the third clock signal terminal CK3 and the fourth clock signal terminal CK4 are both configured to keep the output of a high level signal instead of frequently inputting a high level signal and a low level signal in a high-to-low level transition manner, so that the power consumption of the driver chip can be reduced, and the power consumption of the whole display device can be reduced.

Figure 13:
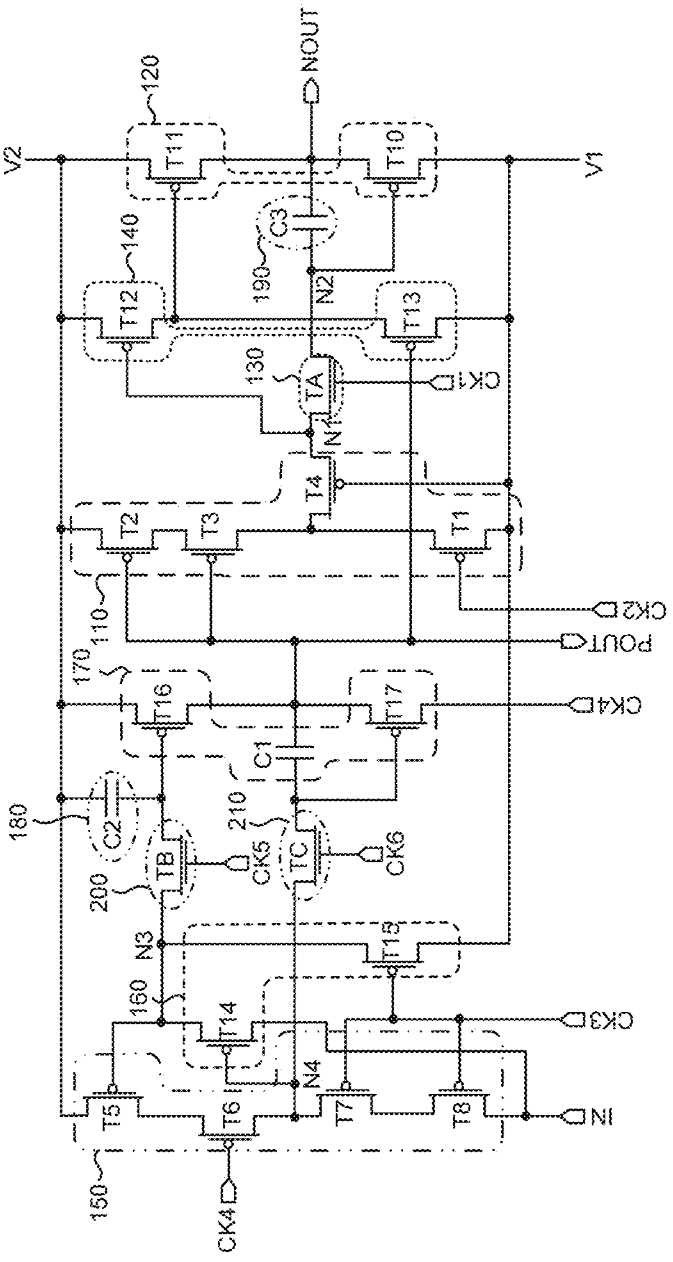
FIG. 13 is a structural diagram of another shift register according to an embodiment of the present disclosure.
Figure 14:
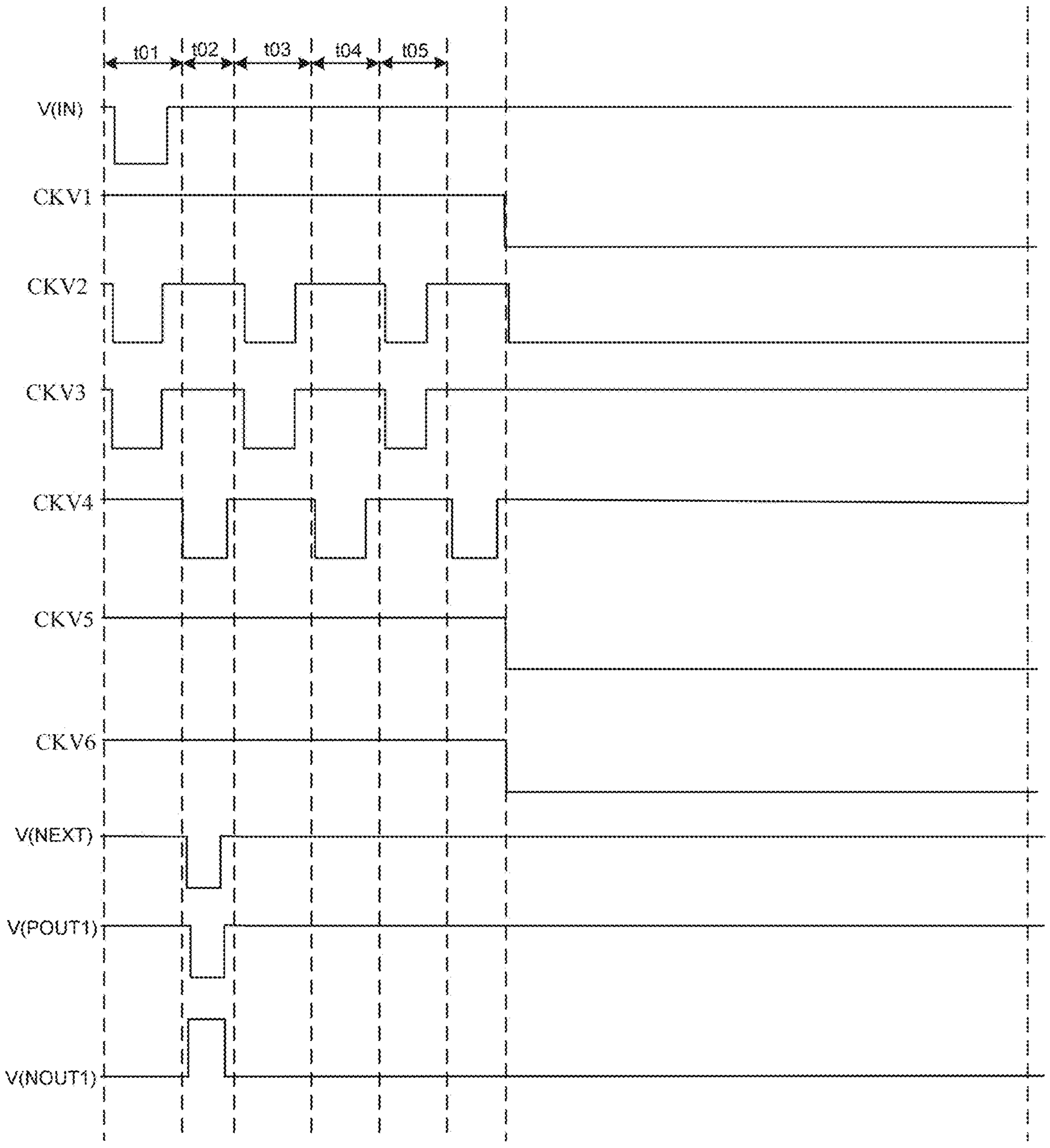
FIG. 14 is a schematic diagram of driving timing of another shift register according to an embodiment of the present disclosure.

FIG. 13 is a structural diagram of another shift register according to an embodiment of the present disclosure, and FIG. 14 is a schematic diagram of driving timing of another shift register according to an embodiment of the present disclosure. Referring to FIGS. 3, 13 and 14, the shift register further includes a third voltage stabilizing device 210 and a sixth clock signal terminal CK6. A first terminal of the third voltage stabilizing device 210 is electrically connected to the output terminal out5 of the third node control device 150. A second terminal of the third voltage stabilizing device 210 is electrically connected to the second control terminal ctr72 of the second output device 170. A control terminal of the third voltage stabilizing device 210 is electrically connected to the sixth clock signal terminal CK6. In the display stage of the first frequency, the third voltage stabilizing device 210 is configured to be turned on according to a control signal provided by the sixth clock signal terminal. In the display stage of the second frequency, the third voltage stabilizing device 210 is configured to be turned on or turned off according to a control signal provided by the sixth clock signal terminal.

Exemplary, in the high level output stage maintained at the second signal output terminal POUT, which is similar to the foregoing stage t03, the gate potential of the sixteenth transistor T16 is a low potential, the sixteenth transistor T16 is turned off, the gate potential of the seventeenth transistor T17 is a high potential, the seventeenth transistor T17 is turned off, and the second output device 170 transmits the high level signal of the second power signal input terminal V2 to the second signal output terminal POUT through the sixteenth transistor T16. In order to ensure that the gate signal of the seventeenth transistor T17 is stable, according to the embodiment of the present disclosure, the third voltage stabilizing device 210 and the sixth clock signal terminal CK6 are added, and the second voltage stabilizing device 210 has the characteristic of a small leakage current. The first terminal of the third voltage stabilizing device 210 is electrically connected to the output terminal out5 of the third node control device 150; the second terminal of the third voltage stabilizing device 210 is electrically connected to the second control terminal ctr72 of the second output device 170; and the control terminal of the third voltage stabilizing device 210 is electrically connected to the sixth clock signal terminal CK6. In the display stage of the first frequency (a high frequency), the third voltage stabilizing device 210 is turned on under the action of the control signal CKV6 provided by the sixth clock signal terminal CK6. Since the display refreshing frequency is high and the leakage current of the third voltage stabilizing device 210 is small, the gate potential of the seventeenth transistor T17 is stable and cannot be changed due to the leakage currents of other transistors, and the seventeenth transistor T17 is kept turned off. Therefore, it is ensured that the high potential signal of the second power signal terminal V2 can be stably transmitted to the second signal output terminal POUT. In the display stage of the second frequency (a low frequency), the third voltage stabilizing device 210 is turned on or turned off under the action of the clock signal CKV6 provided by the sixth clock signal terminal CK6. When the third voltage stabilizing device 210 is turned off, the transmission path of the leakage current between the gate of the seventeenth transistor T17 and another transistor is blocked, and the gate potential of the seventeenth transistor T17 is not changed, to ensure that the high potential signal of the second power signal terminal V2 can be stably transmitted to the second signal output terminal POUT. Even the third voltage stabilizing device 210 is turned on, since the leakage current of the third voltage stabilizing device 210 is small, and the change of the gate potential of the seventeenth transistor T17 is limited, it can also be ensured that the high potential signal of the second power signal terminal V2 can be stably transmitted to the second signal output terminal POUT, the normal display of the display panel driven by the stable scan P signal is ensured, and the flickering cannot occur.

Further, with continued reference to FIG. 13, the third voltage stabilizing device 210 may be a third voltage stabilizing transistor TC. The third voltage stabilizing transistor TC may be an oxide semiconductor transistor, such as the IGZO transistor. The oxide semiconductor transistor is an N-type transistor with high stability and a small leakage current. Even in the display stage of the low frequency, when the oxide semiconductor transistor is turned on, the leakage current of the oxide semiconductor transistor can be ignored compared with the leakage current of the LTPS transistor, so that the raise of the gate potential of the seventeenth transistor T17 is limited and the stable output of the second signal output terminal POUT cannot be affected.

As a feasible implementation, the display stage of the second frequency may include a first sub-stage and a second sub-stage, and the first sub-stage may correspond to the initialization stage and the data signal writing stage of the pixel circuit. In the first sub-stage, the third voltage stabilizing device 210 is configured to be turned on according to the control signal CKV6 provided by the sixth clock signal terminal CK6. In the second sub-stage, the third voltage stabilizing device 210 is configured to be turned off according to the control signal CKV6 provided by the sixth clock signal terminal CK6.

The operating stages of the pixel circuit in the display panel may include an initialization stage, a data signal writing stage (threshold compensation stage) and a light emission stage. Since in the initialization stage and the data signal writing stage, an initialization signal and a data signal need to be normally written into a drive transistor in the pixel circuit, it is necessary to ensure that the transistors located on write paths of the initialization signal and the data signal in the pixel circuit are turned on. Therefore, in the initialization stage and the data signal writing stage, it is necessary to ensure that the second signal output terminal of the shift register normally output the control signal, to ensure the normal writing of the initialization signal and the data signal. Thus, the above first sub-stage may correspond to the initialization stage and the data signal writing stage of the pixel circuit, and the second sub-stage may correspond to the light emission stage of the pixel circuit. Therefore, the third clock signal provided by the third clock signal terminal is a clock signal related to the writing of the initialization signal and the data signal, and the normal writing of the initialization signal and the data signal is ensured on the premise that the stable output of the second signal output terminal is ensured.

With continued reference to FIG. 13, the third node control device 150 includes the fifth transistor T5, the sixth transistor T6, the seventh transistor T7 and the eighth transistor T8. The first electrode of the fifth transistor T5 is the first input terminal in51 of the third node control device 150. The gate of the fifth transistor T5 is the first control terminal ctr51 of the third node control device 150. The second electrode of the fifth transistor T5 is electrically connected to the first electrode of the sixth transistor T6. The gate of the sixth transistor T6 is the third control terminal ctr53 of the third node control device 150. The second electrode of the sixth transistor T6 is electrically connected to the first electrode of the seventh transistor T7 to serve as the output terminal out5 of the third node control device 150. The second electrode of the seventh transistor T7 is electrically connected to the first electrode of the eighth transistor T8. The second electrode of the eighth transistor T8 is the second input terminal in52 of the third node control device 150. The gate of the seventh transistor T7 and the gate of the eighth transistor T8 are electrically connected to each other to be the second control terminal ctr52 of the third node control device 150. The connection relationships and operating processes of the above devices are described in detail in the foregoing embodiments and will not be repeated here.

Further, the first terminal of the third voltage stabilizing device 210 is electrically connected to the second electrode of the sixth transistor T6; and the second terminal of the third voltage stabilizing device 210 is electrically connected to the second control terminal ctr72 of the second output device 170. That is, the third voltage stabilizing device 210 is disposed in series between the output terminal out5 of the third node control device 150 and the second control terminal ctr72 of the second output device 170. The potential of the second control terminal ctr72 of the second output device 170 is stabilized by the third voltage stabilizing device 210, to ensure that the signal of the second control terminal ctr72 of the second output device 170 is stable, the seventeenth transistor T17 is turned off, and the high level signal input into the second power signal terminal V2 can be stably output to the second signal output terminal POUT, and the stable output of the second signal output terminal POUT is ensured.

Figure 15:
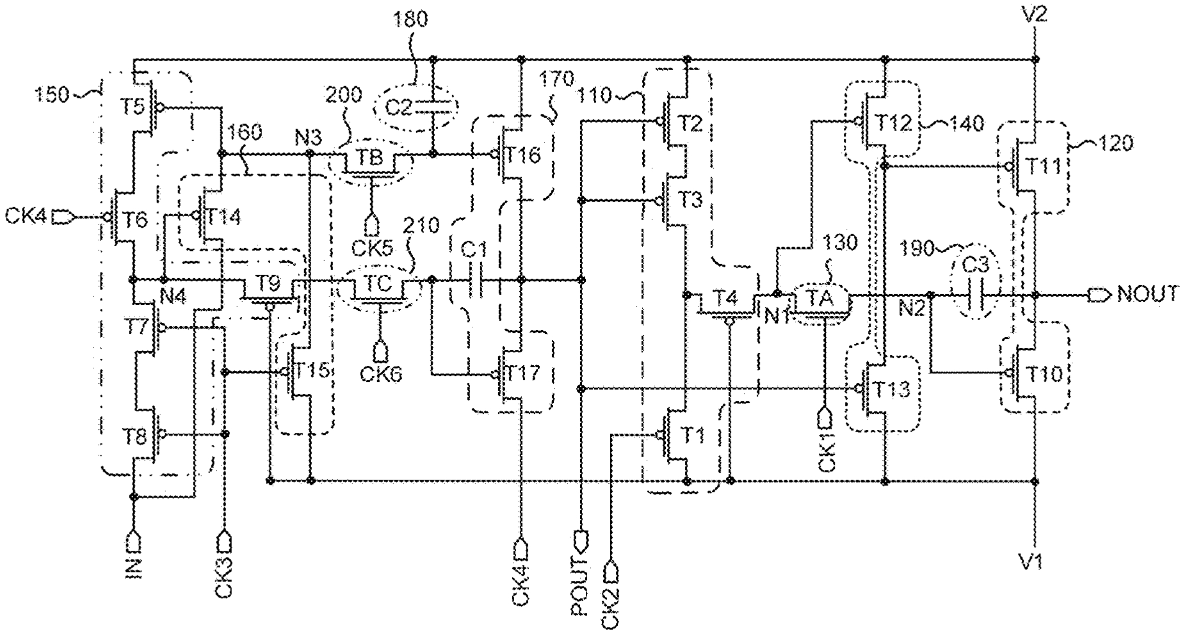
FIG. 15 is a structural diagram of another shift register according to an embodiment of the present disclosure.
Figure 16:
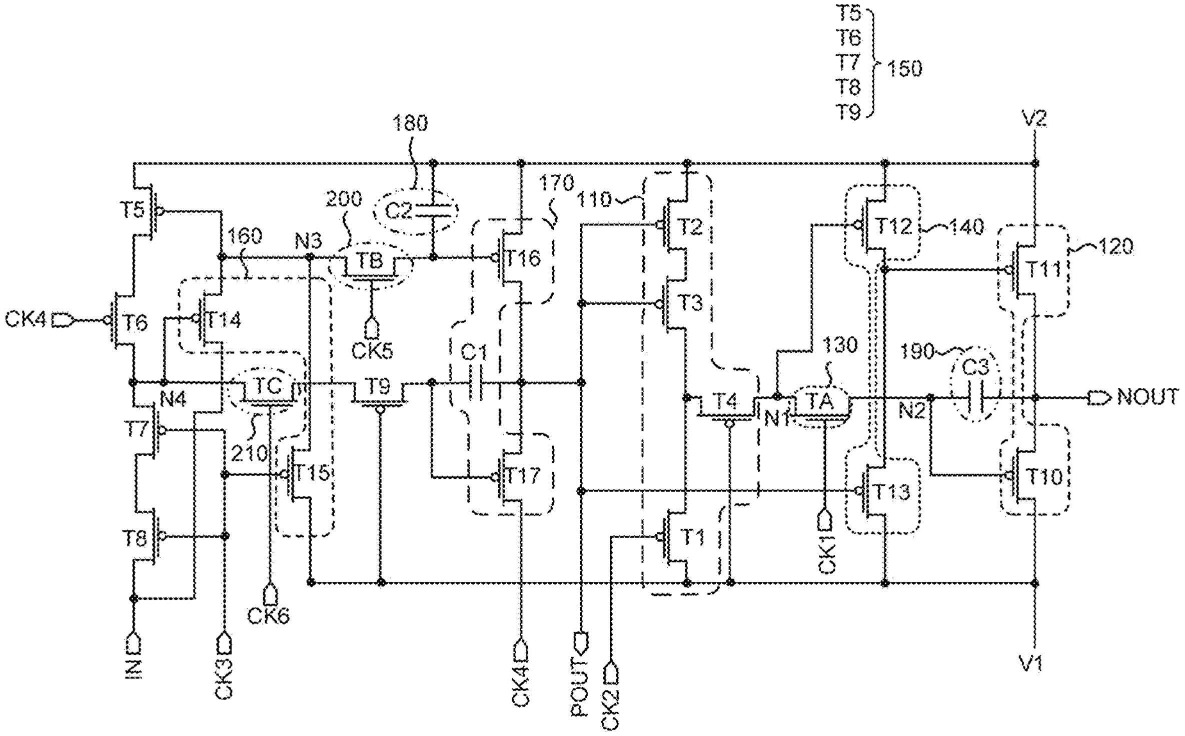
FIG. 16 is a structural diagram of another shift register according to an embodiment of the present disclosure.

As a feasible implementation, FIG. 15 is a structural diagram of another shift register according to an embodiment of the present disclosure, and FIG. 16 is a structural diagram of another shift register according to an embodiment of the present disclosure. Referring to FIGS. 3, 15 and 16, the third node control device 150 further includes a ninth transistor T9. A first electrode of the ninth transistor T9 is electrically connected to the second electrode of the sixth transistor T6; a second electrode of the ninth transistor T9 serves as the output terminal of the third node control device 150 to be electrically connected to the first terminal of the third voltage stabilizing device 210; the second terminal of the third voltage stabilizing device 210 is electrically connected to the second control terminal ctr72 of the second output device 170 (as shown in FIG. 15). In one embodiment, the first terminal of the third voltage stabilizing device 210 is electrically connected to the second electrode of the sixth transistor T6; the second terminal of the third voltage stabilizing device 210 is electrically connected to a first electrode of the ninth transistor T9; and a second electrode of the ninth transistor T9 is electrically connected to the second terminal ctr72 of the second output device 170. A gate of the ninth transistor T9 is electrically connected to the first power signal input terminal V1.

Exemplary, in the shift register of the embodiment of the present disclosure, the third node control device 150 may further include the ninth transistor T9, and the ninth transistor T9 is a P-type transistor. The gate of the ninth transistor T9 is electrically connected to the first power signal input terminal V1, and the ninth transistor T9 is a normally-on transistor. The ninth transistor T9 may be disposed in series between the second electrode of the sixth transistor T6 and the third voltage stabilizing device 210 or may be disposed in series between the third voltage stabilizing device 210 and the second control terminal ctr72 of the second output device 170, which is not limited by the embodiment of the present disclosure. The ninth transistor T9 serves as a normally-on transistor, so that the potential of the second control terminal ctr72 of the second output device 170 is not affected by the second electrode of the sixth transistor T6. Even the leakage current exists in the fifth transistor T5, the sixth transistor T6, the seventh transistor T7 and the eighth transistor T8, then the potential of the second electrode of the sixth transistor T6 is raised, but the ninth transistor T9 can block the potential. Therefore, it can be ensured that the potential of the second control terminal ctr72 of the second output device 170 is kept unchanged, the transmission channel controlled by the second control terminal ctr72 of the second output device 170 is not affected, and the second signal output terminal POUT can output the high level signal of the second power signal input terminal V2, which is conducive to ensuring that the high level of the second signal output terminal POUT keeps stable. In an embodiment, the ninth transistor T9 may be disposed in series between the second electrode of the sixth transistor T6 and the third voltage stabilizing device 210, so it is ensured that the potential of the first terminal of the third voltage stabilizing device 210 is stable, the leakage current between the second electrode of the sixth transistor T6 and the second control terminal ctr72 of the second output device 170 is further avoided, and it is ensured that the second signal output terminal POUT can output the high level signal of the second power signal input terminal V2, which is conducive to ensuring that the low level of the second signal output terminal POUT is stable.

In an embodiment, with continued reference to FIGS. 3, 5, 8, 9, 10, 13, 15 and 16, the shift register further includes the storage device 180 and the coupling device 190. The first terminal of the storage device 180 is electrically connected to the third node N3, and the second terminal of the storage device 180 is electrically connected to the second power signal input terminal V2. The first terminal of the coupling device 190 is electrically connected to the second node N2, and the second terminal of the coupling device 190 is electrically connected to the first signal output terminal NOUT. The storage device 180 may be the second capacitor C2, and the coupling device 190 may be the third capacitor C3. The storage device 180 and the coupling device 190 both have the function of maintaining a stable potential, and the operating processes are described in detail in the foregoing embodiments and will not be repeated here.

In an embodiment, with continued reference to FIGS. 13, 15 and 16, the first voltage stabilizing device 130 includes the first voltage stabilizing transistor TA. The first electrode of the first voltage stabilizing transistor TA is the first terminal of the first voltage stabilizing device 130, the second electrode of the first voltage stabilizing transistor TA is the second terminal of the first voltage stabilizing device 130, and the gate of the first voltage stabilizing transistor TA is the control terminal of the first voltage stabilizing device 130. The second voltage stabilizing device 200 includes the second voltage stabilizing transistor TB. A first electrode of the second voltage stabilizing transistor TB is the first terminal of the second voltage stabilizing device 200, a second electrode of the second voltage stabilizing transistor TB is the second terminal of the second voltage stabilizing device 200, and a gate of the second voltage stabilizing transistor TB is the control terminal of the second voltage stabilizing device 200. The third voltage stabilizing device 210 includes the third voltage stabilizing transistor TC. A first electrode of the third voltage stabilizing transistor TC is the first terminal of the third voltage stabilizing device 210, a second electrode of the third voltage stabilizing transistor TC is the second terminal of the third voltage stabilizing device 210, and a gate of the third voltage stabilizing transistor TC is the control terminal of the third voltage stabilizing device 210. The first voltage stabilizing transistor TA, the second voltage stabilizing transistor TB and the third voltage stabilizing transistor TC are all oxide semiconductor transistors, to ensure that the first voltage stabilizing device 130, the second voltage stabilizing device 200 and the third voltage stabilizing device 210 each have a relatively small leakage current, the first signal output terminal NOUT and the second signal output terminal POUT have good and stable outputs, the P-type transistor and the N-type transistor in the pixel circuit are stably driven, and the display device stably performs displaying.

Figure 17:
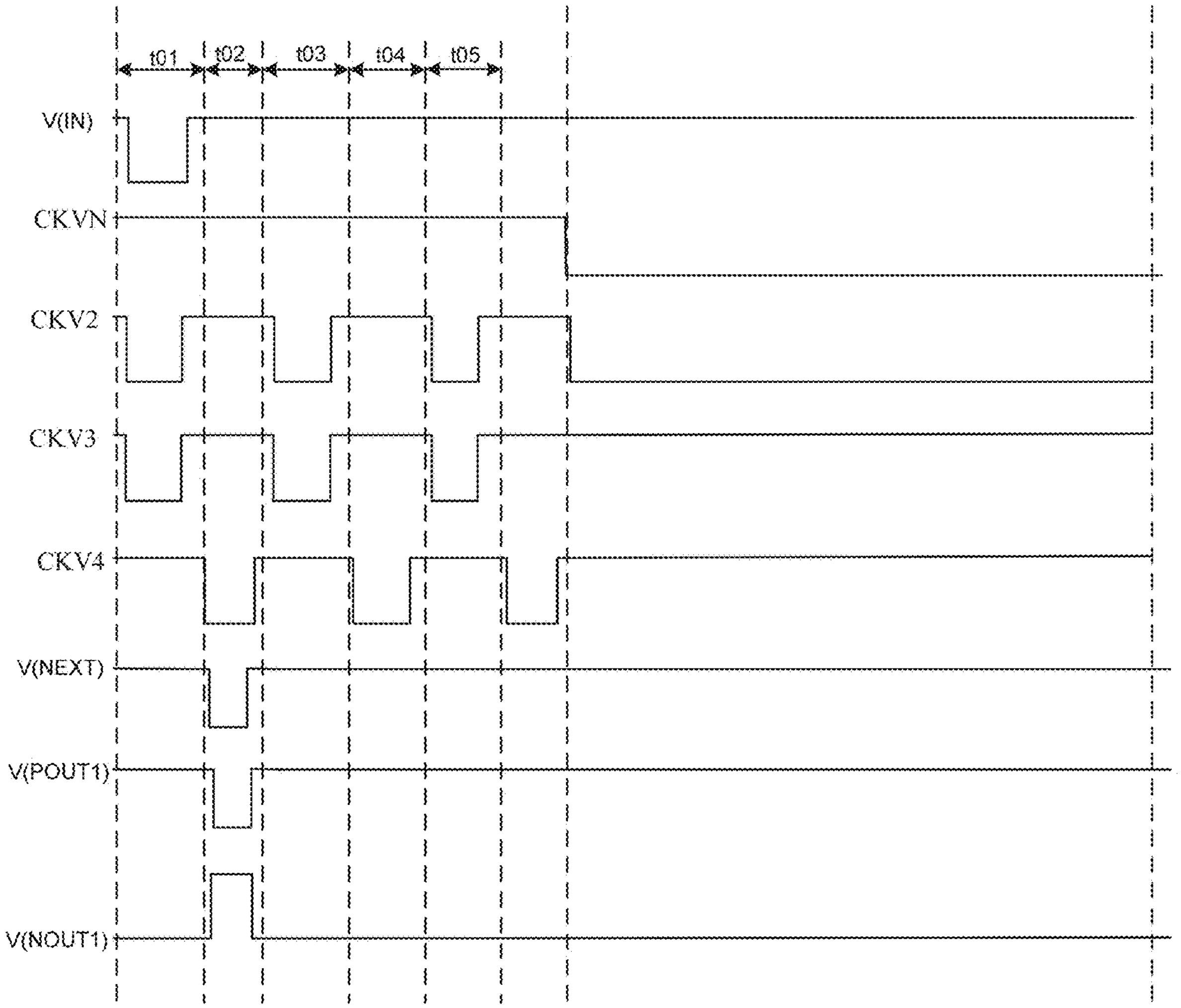
FIG. 17 is a schematic diagram of driving timing of another shift register according to an embodiment of the present disclosure.

FIG. 17 is a schematic diagram of driving timing of another shift register according to an embodiment of the present disclosure. Referring to FIGS. 14 and 17, it can be seen from FIG. 14 that the clock signal CKV1 provided by the first clock signal terminal CK1, the clock signal CKV5 provided by the fifth clock signal terminal CK5 and the clock signal CKV6 provided by the sixth clock signal terminal CK6 are the same clock signal. Therefore, the first clock signal terminal CK1, the fifth clock signal terminal CK5 and the sixth clock signal terminal CK6 may be configured to have the same clock signal, as the CKN shown in FIG. 17, to ensure that the structure of the shift register is simple, and the driving method of the shift register is simple.

Figure 18:
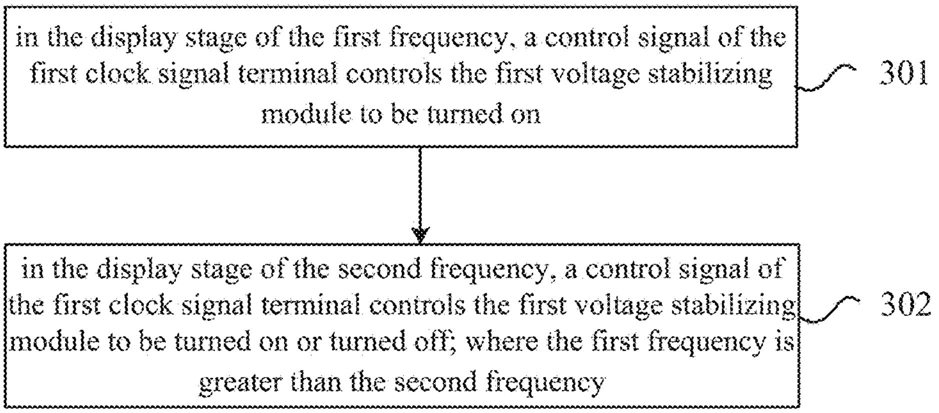
FIG. 18 is a flow chart of a driving method of a shift register according to an embodiment of the present disclosure.

Based on the same concept, an embodiment of the present disclosure further provides a driving method of a shift register, which is applied for driving the shift register according to any one of the above embodiments. FIG. 18 is a flow chart of a driving method of a shift register according to an embodiment of the present disclosure. As shown in FIG. 18, the driving method of the shift register according to the embodiment of the present disclosure includes the steps described below.

In step S301, in the display stage of the first frequency, a control signal of the first clock signal terminal controls the first voltage stabilizing device to be turned on.

In step S302, in the display stage of the second frequency, a control signal of the first clock signal terminal controls the first voltage stabilizing device to be turned on or turned off; where the first frequency is greater than the second frequency.

Exemplary, the detailed structure and operating timing of the shift register are described in detail in the foregoing description and will not be repeated here. Referring to FIGS. 3 and 4, in the display stage of the first frequency (a high frequency), the control signal of the first clock signal terminal CK1 controls the first voltage stabilizing device 130 to be turned on. Since the display refreshing frequency is high and the leakage current of the first voltage stabilizing device 130 is small, the potential of the second node N2 is stable and cannot be raised due to the leakage current, to ensure that the first output device 120 outputs a stable scan N signal. In the display stage of the second frequency (a low frequency), the first voltage stabilizing device 130 is turned on or turned off under the action of the clock signal provided by the first clock signal terminal CK1. When the first voltage stabilizing device 130 is turned off, the transmission path of the leakage current between the first node N1 and the second node N2 is blocked, the potential of the second node N2 is not raised, to ensure that the first signal output terminal NOUT outputs a stable scan N signal. Even the first voltage stabilizing device 130 is turned on, since the leakage current of the first voltage stabilizing device 130 is small, the raise of the potential of the second node N2 is limited, so it can also be ensured that the first signal output terminal NOUT outputs a stable scan N signal, the normal display of the display panel driven by the stable scan N signal is ensured, and the flickering cannot occur.

Further, the display stage of the second frequency includes the first sub-stage and the second-sub stage, and the first sub-stage corresponds to the initialization stage and the data signal writing stage of the pixel circuit.

The step in which in the display stage of the second frequency, the control signal of the first clock signal terminal controls the first voltage stabilizing transistor to be turned on or turned off includes the steps described below.

In the first sub-stage, the control signal provided by the first clock signal terminal controls the first voltage stabilizing device to be turned on.

In the second sub-stage, the control signal provided by the first clock signal terminal controls the first voltage stabilizing device to be turned off.

The operating stages of the pixel circuit in the display panel may include an initialization stage, a data signal writing stage (threshold compensation stage) and a light emission stage. Since in the initialization stage and the data signal writing stage, an initialization signal and a data signal need to be normally written into a drive transistor in the pixel circuit, it is necessary to ensure that the transistors located on write paths of the initialization signal and the data signal in the pixel circuit are turned on. Therefore, in the initialization stage and the data signal writing stage, it is necessary to ensure that the first signal output terminal of the shift register normally output the control signal, to ensure the normal writing of the initialization signal and the data signal. Thus, the above first sub-stage may correspond to the initialization stage and the data signal writing stage of the pixel circuit, and the second sub-stage may correspond to the light emission stage of the pixel circuit. Therefore, in the display stage of the second frequency, the control signal of the first clock signal terminal controls the first voltage stabilizing transistor to be turned on or turned off. In the first sub-stage, the control signal provided by the first clock signal terminal controls the first voltage stabilizing device to be turned on. In the second sub-stage, the control signal provided by the first clock signal terminal controls the first voltage stabilizing device to be turned off. In this way, the first clock signal provided by the first clock signal terminal is a clock signal related to the writing of the initialization signal and the data signal, and the normal writing of the initialization signal and the data signal is ensured on the premise that the stable output of the first signal output terminal is ensured.

As a feasible implementation, with continued reference to FIG. 3, the shift register may further include the second node control device 140 and the second clock signal terminal CK2. The first input terminal in41 of the second node control device 140 is electrically connected to the second power signal input terminal V2. The first control terminal ctr41 of the second node control device 140 is electrically connected to the first node N1. The output terminal out4 of the second node control device 140 is electrically connected to the second control terminal ctr32 of the first output device 120. The first input terminal in21 of the first node control device 110 is electrically connected to the first signal input terminal V1, and the first control terminal ctr21 of the first node control device 110 is electrically connected to the second clock signal terminal CK2. In the low level output stage of the first signal output terminal, a low level signal is input into the second clock signal terminal CK2 to control the first node control device 110 to output the low level signal, the second node control device 140 outputs a high level signal, and the first signal output terminal and the second power signal input terminal are not turned on.

Exemplary, in the low level output stage of the first signal output terminal NOUT, the second node N2 is kept at a low level, the tenth transistor T10 is turned on, and the first power signal terminal V1 writes a low level signal into the first output terminal NOUT through the turned-on tenth transistor T10, to ensure the low level output of the first signal output terminal NOUT. When the low level output stage of the first signal output terminal NOUT corresponds to a turned-off stage of the first voltage stabilizing device 130, that is, the low level output stage of the first signal output terminal NOUT corresponds to a low level stage of a timing signal CKV1 output by the first clock signal terminal CK1, a timing signal CKV2 input into the second clock signal terminal CK2 may be set to be kept at a low level. Thus, the first transistor T1 is ensured to be turned on, the low level signal input into the first power signal terminal V1 is written into the first node N1. Therefore, the fifteenth transistor T15 in the second node control device 140 is turned on, the high level signal of the second power signal terminal V2 is output through the turned-on fifteenth transistor, and the sixteenth transistor T16 in the first output device 120 is controlled to be turned off, so that the high level signal of the second power signal terminal V2 cannot be transmitted to the first signal output terminal NOUT, and the first signal output terminal NOUT maintains the low level output. In the low level output stage of the first signal output terminal, a low level signal is input into the second clock signal terminal CK2 to control the first node control device 110 to output a low level signal, the second node control device 140 outputs a high level signal, the first signal output terminal and the second power signal input terminal are not turned on, to ensure that the second clock signal terminal CK2 outputs a single stable signal instead of frequently inputting a high level signal and a low level signal in a high-to-low level transition manner while ensuring that the first signal output terminal NOUT stably outputs a low potential signal. Therefore, the power consumption of the driver chip can be reduced, and the power consumption of the whole display device can be reduced.

As a feasible implementation, referring to FIGS. 3, 10 and 11, the shift register further includes the third node control device 150, the second voltage stabilizing device 200, the second output device 170, the second signal output terminal POUT and the fifth clock signal terminal CK5. The first input terminal in51 of the third node control device 150 is electrically connected to the second power signal input terminal V2. The first control terminal ctr51 of the third node control device 150 is electrically connected to the first terminal of the second voltage stabilizing device 200 at the third node N3. The second terminal of the second voltage stabilizing device 200 is electrically connected to the first control terminal ctr71 of the second output device 170. The control terminal of the second voltage stabilizing device 200 is electrically connected to the fifth clock signal terminal CK5. In the display stage of the first frequency, a control signal CKV5 of the fifth clock signal terminal CK5 controls the second voltage stabilizing device 200 to be turned on. In the display stage of the second frequency, a control signal CKV5 of the fifth clock signal terminal CK5 controls the second voltage stabilizing control device 200 to be turned on or turned off.

Exemplary, in the high level output stage maintained at the second signal output terminal POUT, which is similar to the foregoing stage t03, the gate potential of the sixteenth transistor T16 is a low potential, the sixteenth transistor T16 is turned on, and the second output device 170 transmits the high level signal of the second power signal input terminal V2 to the second signal output terminal POUT through the sixteenth transistor T16. In order to ensure that the gate signal of the sixteenth transistor T16 is stable, according to the embodiment of the present disclosure, the second voltage stabilizing device 200 and the fifth clock signal terminal CK5 are added, and the second voltage stabilizing device 200 has the characteristic of a small leakage current. The first terminal of the second voltage stabilizing device 200 is electrically connected to the first control terminal ctr51 of the third node control device 150, the second terminal of the second voltage stabilizing device 200 is electrically connected to the first control terminal ctr71 of the second output device 170, and the control terminal of the second voltage stabilizing device 200 is electrically connected to the fifth clock signal terminal CK5. In the display stage of the first frequency (a high frequency), the control signal CKV5 of the fifth clock signal terminal CK5 controls the second voltage stabilizing device 200 to be turned on. Since the display refreshing frequency is high and the leakage current of the second voltage stabilizing device 200 is small, the gate potential of the sixteenth transistor T16 is stable and cannot be raised due to the leakage currents of other transistors. Therefore, it is ensured that the high potential signal of the second power signal terminal V2 can be stably transmitted to the second signal output terminal POUT. In the display stage of the second frequency (a low frequency), the control signal CKV5 of the fifth clock signal terminal CK5 controls the second voltage stabilizing device 200 to be turned on or turned off. When the second voltage stabilizing device 200 is turned off, the transmission path of the leakage current between the gate of the sixteenth transistor T16 and another transistor is blocked, the gate potential of the sixteenth transistor T16 is not raised, to ensure that the high potential signal of the second power signal terminal V2 can be stably transmitted to the second signal output terminal POUT. Even the second voltage stabilizing device 200 is turned on, since the leakage current of the second voltage stabilizing device 200 is small, the raise of the gate potential of the sixteenth transistor T16 is limited, it can also be ensured that the high potential signal of the second power signal terminal V2 can be stably transmitted to the second signal output terminal POUT, the normal display of the display panel driven by the stable scan P signal is ensured, and the flickering cannot occur.

On the basis of the above embodiments, the display stage of the second frequency includes the first sub-stage and the second-sub stage, and the first sub-stage corresponds to the initialization stage and the data signal writing stage of the pixel circuit. The step in which in the display stage of the second frequency, the control signal of the fifth clock signal terminal controls the second voltage stabilizing device to be turned on or turned off includes the steps described below.

In the first sub-stage, the control signal of the fifth clock signal terminal controls the second voltage stabilizing control device to be turned on.

In the second sub-stage, the control signal of the fifth clock signal terminal controls the second voltage stabilizing control device to be turned off.

The operating stages of the pixel circuit in the display panel may include an initialization stage, a data signal writing stage (threshold compensation stage) and a light emission stage. Since in the initialization stage and the data signal writing stage, an initialization signal and a data signal need to be normally written into a drive transistor in the pixel circuit, it is necessary to ensure that the transistors located on write paths of the initialization signal and the data signal in the pixel circuit are turned on. Therefore, in the initialization stage and the data signal writing stage, it is necessary to ensure that the second signal output terminal of the shift register normally outputs the control signal, to ensure the normal writing of the initialization signal and the data signal. Thus, the above first sub-stage may correspond to the initialization stage and the data signal writing stage of the pixel circuit, and the second sub-stage may correspond to the light emission stage of the pixel circuit. In the display stage of the second frequency, the control signal of the fifth clock signal terminal controls the second voltage stabilizing transistor to be turned on or turned off. In the first sub-stage, the control signal of the fifth clock signal terminal controls the second voltage stabilizing device to be turned on, and in the second sub-stage, the control signal of the fifth clock signal terminal controls the second voltage stabilizing device to be turned off. In this way, the second clock signal provided by the second clock signal terminal is a clock signal related to the writing of the initialization signal and the data signal, and the normal writing of the initialization signal and the data signal is ensured on the premise that the stable output of the second signal output terminal is ensured.

On the basis of the above embodiments, referring to FIGS. 3, 10 and 12, the shift register further includes the fourth node control device 160, the shift register signal input terminal IN, the third clock signal terminal CK3 and the fourth clock signal terminal CK4. The second input terminal in52 of the third node control device 150 is electrically connected to the shift register signal input terminal IN. The second control terminal ctr62 of the fourth node control device 160 is electrically connected to the third clock signal terminal CK3. The third control terminal ctr53 of the third node control device 150 is electrically connected to the fourth clock signal terminal CK4. The output terminal out5 of the third node control device 150, the first control terminal ctr61 of the fourth node control device 160 and the second control terminal ctr71 of the second output device 170 are electrically connected at the fourth node N4. The first input terminal in61 of the fourth node control device 160 is electrically connected to the shift register signal input terminal IN. The second input terminal in62 of the fourth node control device 160 is electrically connected to the first power signal input terminal V1. The second control terminal ctr62 of the fourth node control device 160 is electrically connected to the third clock signal terminal CK3. The output terminal out6 of the fourth node control device 160 is electrically connected to the third node N3. The first input terminal in71 of the second output device 170 is electrically connected to the second power signal input terminal V2. The second input terminal in72 of the second output device 170 is electrically connected to the fourth clock signal terminal CK4. The output terminal out7 of the second output device 170 is electrically connected to the second signal output terminal POUT. In the high level output stage of the second signal output terminal POUT, a high level signal is input into each of the third clock signal terminal CK3 and the fourth clock signal terminal CK4. The second signal output terminal POUT and the second power signal input terminal V2 are turned on.

Exemplary, in the high level output stage of the second signal output terminal POUT, the gate potential of the sixteenth transistor T16 is a low potential, the sixteenth transistor T16 is turned on, and the second output device 170 transmits the high level signal of the second power signal input terminal V2 to the second signal output terminal POUT through the sixteenth transistor T16, to ensure the high level output of the second signal output terminal POUT. When the low level output stage of the second signal output terminal POUT corresponds to a turned-off stage of the second voltage stabilizing device 200, that is, the low level output stage of the second signal output terminal POUT corresponds to a low level stage of a timing signal CKV5 output by the fifth clock signal terminal CK5, the third clock signal terminal CK3 and the fourth clock signal terminal CK4 may be configured to keep the output of the high level signal. Thus, the sixteenth transistor T16 is ensured to be turned on, the high level signal of the second power signal terminal V2 is output by the turned-on sixteenth transistor, and the second signal output terminal POUT maintains the high level output. When the high level output stage of the second signal output terminal POUT corresponds to the low level stage of the timing signal CKV1 output by the first clock signal terminal CK1, in the high level output stage of the second signal output terminal POUT, a high level signal is input into both the third clock signal terminal CK3 and the fourth clock signal terminal CK4, to ensure that the second signal output terminal POUT and the second power signal input terminal V2 are turned on and ensure that the third clock signal terminal CK3 and the fourth clock signal terminal CK4 output a single stable signal instead of frequently inputting a high level signal and a low level signal in a high-to-low level transition manner while ensuring the stable high level output of the second signal output terminal POUT. Therefore, the power consumption of the driver chip can be reduced, and the power consumption of the whole display device can be reduced.

On the basis of the above embodiments, referring to FIGS. 3, 13 and 14, the shift register further includes the third voltage stabilizing device 210 and the sixth clock signal terminal CK6. The first terminal of the third voltage stabilizing device 210 is electrically connected to the output terminal out5 of the third node control device 150. The second terminal of the third voltage stabilizing device 210 is electrically connected to the second control terminal ctr72 of the second output device 170. The control terminal of the third voltage stabilizing device 210 is electrically connected to the sixth clock signal terminal CK6. In the display stage of the first frequency, a control signal CK6 of the sixth clock signal terminal CK6 controls the third voltage stabilizing device 210 to be turned on. In the display stage of the second frequency, a control signal CKV6 of the sixth clock signal terminal CK6 controls the third voltage stabilizing device 210 to be turned on or turned off.

Exemplary, in the high level output stage maintained at the second signal output terminal POUT, which is similar to the foregoing stage t03, the gate potential of the sixteenth transistor T16 is a low potential, the sixteenth transistor T16 is turned off, the gate potential of the seventeenth transistor T17 is a high potential, the seventeenth transistor T17 is turned off, and the second output device 170 transmits the high level signal of the second power signal input terminal V2 to the second signal output terminal POUT through the sixteenth transistor T16. In order to ensure that the gate signal of the seventeenth transistor T17 is stable, according to the embodiment of the present disclosure, the third voltage stabilizing device 210 and the sixth clock signal terminal CK6 are added, and the third voltage stabilizing device 210 has the characteristic of a small leakage current. The first terminal of the third voltage stabilizing device 210 is electrically connected to the output terminal out5 of the third node control device 150; the second terminal of the third voltage stabilizing device 210 is electrically connected to the second control terminal ctr72 of the second output device 170; and the control terminal of the third voltage stabilizing device 210 is electrically connected to the sixth clock signal terminal CK6. In the display stage of the first frequency (a high frequency), the control signal CKV6 provided by the sixth clock signal terminal CK6 controls the third voltage stabilizing device 210 to be turned on. Since the display refreshing frequency is high and the leakage current of the third voltage stabilizing device 210 is small, the gate potential of the seventeenth transistor T17 is stable and cannot be changed due to the leakage currents of other transistors, and the seventeenth transistor T17 is kept turned off, to ensure that the high potential signal of the second power signal terminal V2 can be stably transmitted to the second signal output terminal POUT. In the display stage of the second frequency (a low frequency), the clock signal CKV6 provided by the sixth clock signal terminal CK6 controls the third voltage stabilizing device 210 to be turned on or turned off. When the third voltage stabilizing device 210 is turned off, the transmission path of the leakage current between the gate of the seventeenth transistor T17 and another transistor is blocked, and the gate potential of the seventeenth transistor T17 is not changed, to ensure that the high potential signal of the second power signal terminal V2 can be stably transmitted to the second signal output terminal POUT. Even the third voltage stabilizing device 210 is turned on, since the leakage current of the third voltage stabilizing device 210 is small, and the change of the gate potential of the seventeenth transistor T17 is limited, it can also be ensured that the high potential signal of the second power signal terminal V2 can be stably transmitted to the second signal output terminal POUT, the normal display of the display panel driven by the stable scan P signal is ensured, and the flickering cannot occur.

On the basis of the above embodiments, the display stage of the second frequency includes the first sub-stage and the second-sub stage, and the first sub-stage corresponds to the initialization stage and the data signal writing stage of the pixel circuit.

The step in which in the display stage of the second frequency, the control signal of the sixth clock signal terminal controls the third voltage stabilizing device to be turned on or turned off includes the steps described below.

In the first sub-stage, the control signal of the sixth clock signal terminal controls the third voltage stabilizing control device to be turned on.

In the second sub-stage, the control signal of the sixth clock signal terminal controls the third voltage stabilizing control device to be turned off.

The operating stages of the pixel circuit in the display panel may include an initialization stage, a data signal writing stage (threshold compensation stage) and a light emission stage. Since in the initialization stage and the data signal writing stage, an initialization signal and a data signal need to be normally written into a drive transistor in the pixel circuit, it is necessary to ensure that the transistors located on write paths of the initialization signal and the data signal in the pixel circuit are turned on. Therefore, in the initialization stage and the data signal writing stage, it is necessary to ensure that the second signal output terminal of the shift register normally outputs the control signal, to ensure the normal writing of the initialization signal and the data signal. Thus, the above first sub-stage may correspond to the initialization stage and the data signal writing stage of the pixel circuit, and the second sub-stage may correspond to the light emission stage of the pixel circuit. In the display stage of the second frequency, the control signal of the sixth clock signal terminal controls the third voltage stabilizing transistor to be turned on or turned off. In the first sub-stage, the control signal of the sixth clock signal terminal controls the third voltage stabilizing device to be turned on, and in the second sub-stage, the control signal of the sixth clock signal terminal controls the third voltage stabilizing device to be turned off. In this way, the third clock signal provided by the third clock signal terminal is a clock signal related to the writing of the initialization signal and the data signal, and the normal writing of the initialization signal and the data signal is ensured on the premise that the stable output of the second signal output terminal is ensured.

Based on the same concept, an embodiment of the present disclosure further provides a gate driving circuit. The gate driving circuit includes cascaded shift registers according to any one of the above implementations, so that the gate driving circuit also has the effects of the shift register in the above implementations. The same content may be understood by referring to the above description of the shift register and will not be repeated below.

Figure 19:
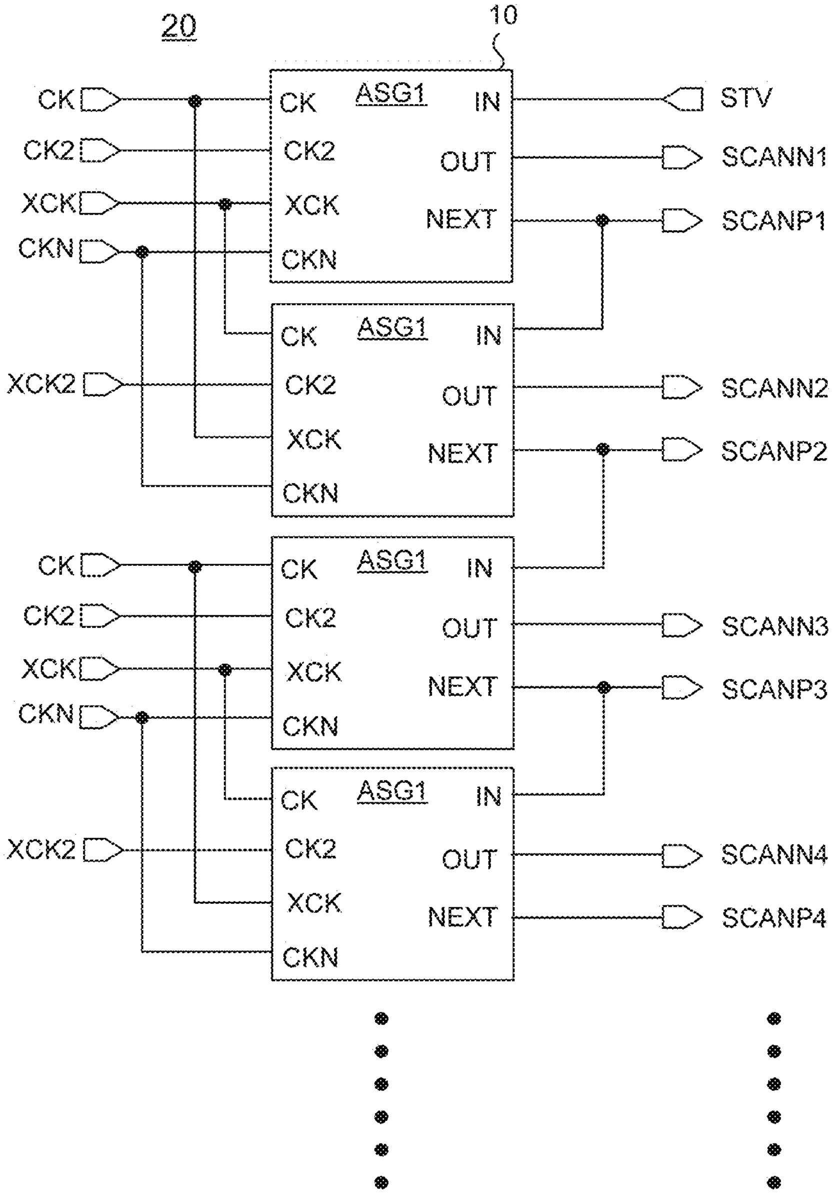
FIG. 19 is a structural diagram of a gate driving circuit according to an embodiment of the present disclosure.

FIG. 19 is a structural diagram of a gate driving circuit according to an embodiment of the present disclosure. As shown in FIG. 19, the gate driving circuit 20 includes cascaded shift registers 10. FIG. 19 exemplary shows four levels of the shift registers 10, i.e. the shift register ASG1 at a first level, the shift register ASG2 at a second level, the shift register ASG3 at a third level and the shift register ASG4 at a fourth level. A shift register signal input terminal IN of the shift register ASG1 at the first level is electrically connected to an initial signal input terminal STV of the gate driving circuit 20. A first signal output terminal NEXT (i.e. the foregoing terminal POUT) of the shift register 10 at an i-th level is electrically connected to a shift register signal input terminal IN of the shift register 10 at an (i+1)-th level, where i is a positive integer.

Exemplary, the shift register ASG1 at the first level is triggered by a signal input into the initial signal input terminal STV, a second signal output terminal outputs a low level in the second stage, and a first signal output terminal outputs a high level. The low level output by the second signal output terminal triggers the shift register ASG2 at the second level to enable the shift register ASG2 at the second level to start operating. Meanwhile, the shift register ASG1 at the first level keeps that the second signal output terminal outputs a high level and the first signal output terminal outputs a low level from the third stage, so that the cascaded shift registers sequentially output high and low level signals. The CKN signal terminal in FIG. 19 may be understood as a first clock signal terminal CK1, or a fifth clock signal terminal CK5 or a sixth clock signal terminal CK 6, and clock signals input into the above three clock signal terminals are the same, so that the three clock signal terminals may be integrated into one clock signal terminal CKN. CK may be understood as a third clock signal terminal, and XCK may be understood as a fourth clock signal terminal; or CK may be a fourth clock signal terminal, and XCK may be understood as a third clock signal terminal. The CK clock signal terminal and the XCK clock signal terminal are clock signal terminals respectively with high and low levels opposite to each other. Further, in order to implement the shift outputs of scanP and scanN, a CK clock signal terminal of the shift register ASG2 at the second level may be electrically connected to an XCK clock signal terminal of the shift register ASG1 at the first level, and an XCK clock signal terminal of the shift register ASG2 at the second level may be electrically connected to a CK clock signal terminal of the shift register ASG1 at the first level. In addition, a CK2 clock signal may be input into both a CK2 clock signal terminal of the shift register ASG1 at the first level and a CK2 clock signal terminal of the shift register ASG3 at the third level, and an XCK2 clock signal may be input into both a CK2 clock signal terminal of the shift register ASG2 at the second level and a CK2 clock signal terminal of the shift register ASG4 at the fourth level. The CK2 clock signal and the XCK2 clock signal are clock signals respectively with high and low levels opposite to each other.

Based on the same concept, an embodiment of the present disclosure further provides a display panel. The display panel includes the gate driving circuit according to any one of the above embodiments, so that the display panel also has the effects of the gate driving circuit and shift register in the gate driving circuit according to the above implementations. The same content may be understood by referring to the above description of the shift register and the gate driving circuit and will not be repeated below.

Figure 20:
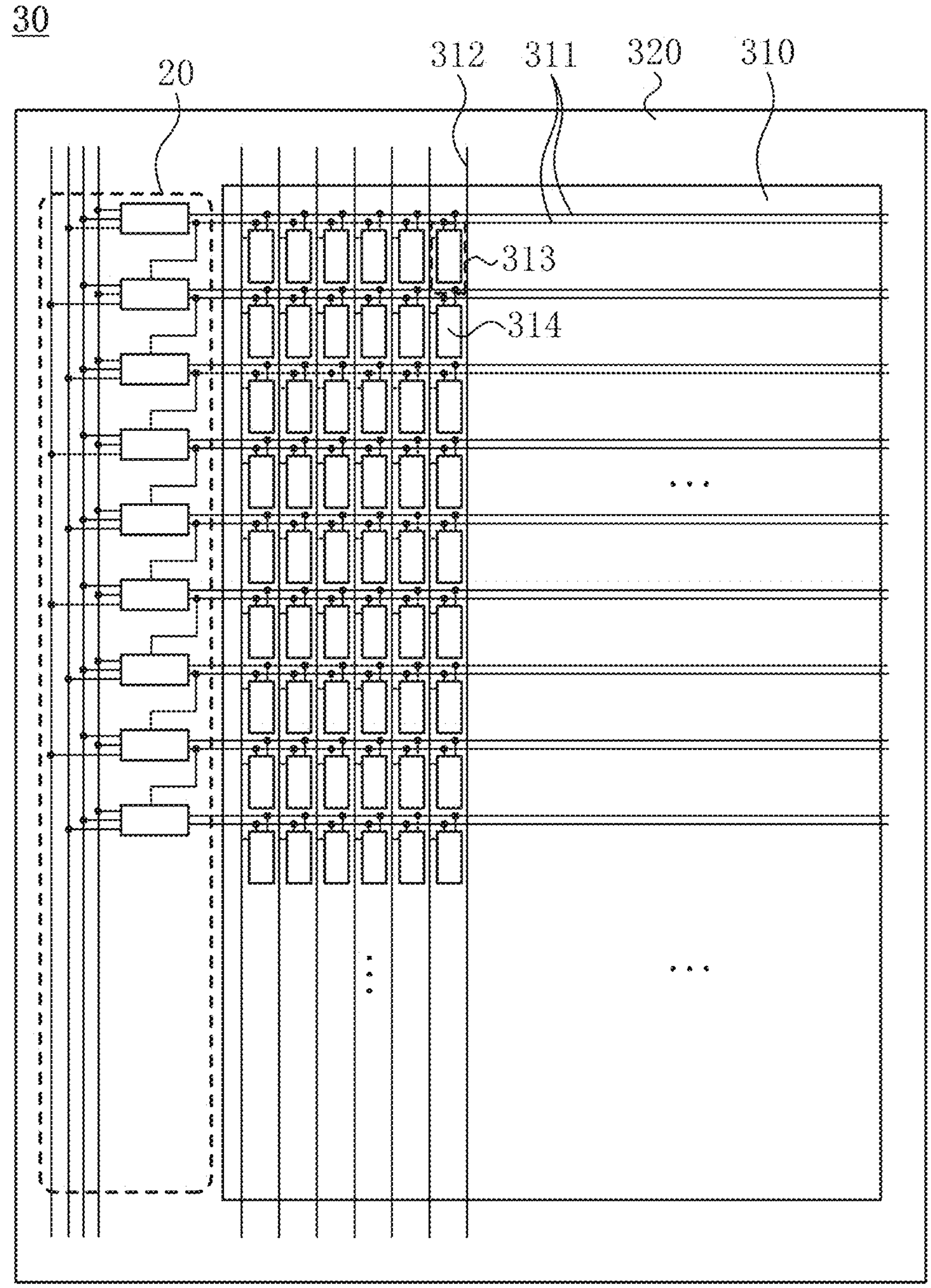
FIG. 20 is a structural diagram of a display panel according to an embodiment of the present disclosure.

FIG. 20 is a structural diagram of a display panel according to an embodiment of the present disclosure. As shown in FIG. 20, the display panel 30 includes a display region 310 and a non-display region 320 surrounding the display region 310, where the non-display region 320 is provided with a gate driving circuit 20. The display region 310 is provided with a plurality of scanning lines 311 and a plurality of data lines 312, and the plurality of scanning lines 311 and the plurality of data lines 312 are intersected to define a plurality of sub-pixel regions 313. Each of the plurality of sub-pixel regions 313 is provided with a pixel circuit 314. The pixel circuit 314 includes at least one N-type transistor and at least one P-type transistor (not shown in FIG. 20). In each row of pixel circuits 314, a control terminal of the N-type transistor is electrically connected to the first signal output terminal of the shift register at one level through one scanning line, and a control terminal of the P-type transistor is electrically connected to a second signal output terminal of the shift register at the one level through another scanning line.

The display region 310 of the display panel 30 is configured to display the image to be displayed.

In one embodiment, the display panel 30 may be an organic light emitting diode liquid (OLED) display panel or other types of display panels, which is not limited by the embodiment of the present disclosure.

The non-display region 320 of the display panel 30 may further include an anti-static circuit, an integrated circuit and other circuit structures, which is not limited by the embodiment of the present disclosure.

The scan lines 311 and the data lines 312 may or may not be intersected vertically, which is not limited by the embodiment of the present disclosure. The scan lines 311 and the data lines 312 are shown only, by way of example, as straight lines in FIG. 20. In the actual product structure of the display panel 30, the actual shapes of the scanning lines 311 and the data lines 312 may be set according to the actual requirements of the display panel 30, which is not limited by the embodiment of the present disclosure.

The circuit element structure of the pixel circuit 314 in FIG. 20 may include a transistor (T) and a capacitor (C), such as a 7T1C circuit, or other circuit structures, which is not limited by the embodiment of the present disclosure. The N-type transistor is a high level enable transistor and is driven by a signal output by the second signal output terminal of the shift register in the gate driving circuit. The p-type transistor is a low level enable transistor and is driven by a signal output by the first signal output terminal of the shift register in the gate driving circuit.

Further, the gate driving circuit 20 may be disposed on one side of the display region 310 (as shown in FIG. 20) or on two oppositely-disposed sides of the display region 310 (not shown in FIG. 20), which is not limited by the embodiment of the present disclosure.

Based on the same concept, an embodiment of the present disclosure further provides a display device. The display device includes a display panel according to any one of the above implementations. Exemplary, referring to FIG. 21, the display device 40 includes a display panel 30. Therefore, the display device also has the effects of the display panel, the gate driving circuit and the shift register according to the above implementations. The same content may be understood by referring to the above description of the display panel, the gate driving circuit and the shift register and will not be repeated below.

Figure 21:
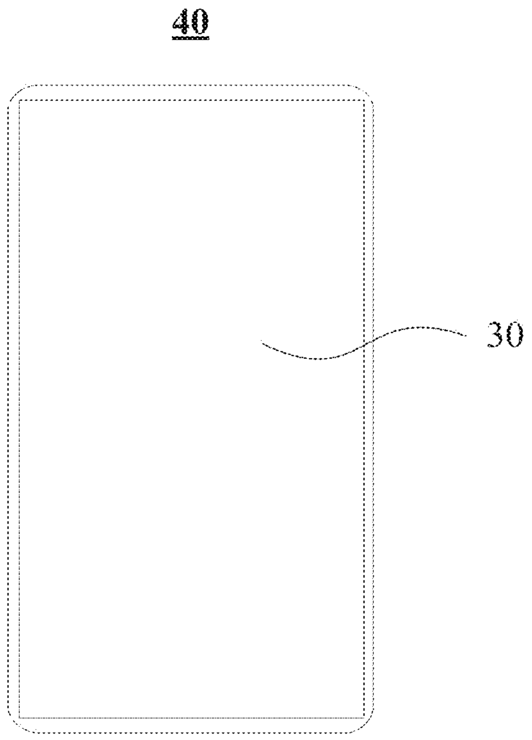
FIG. 21 is a structural diagram of a display device according to an embodiment of the present disclosure.

The display device 40 provided by the embodiment of the present disclosure may be the phone shown in FIG. 21 or any electronic product with a display function including but not limited to the followings: a television, a notebook computer, a desktop display, a tablet computer, a digital camera, a smart bracelet, a pair of smart glasses, a vehicle-mounted display, industrial control equipment, a medical display screen, and a touch interactive terminal, which is not particularly limited by the embodiment of the present disclosure.

What is claimed is:

1. A shift register, comprising:

a first power signal input terminal, a second power signal input terminal, a first signal output terminal, a first node control device, a first output device, a first voltage stabilizing device and a first clock signal terminal; wherein a first terminal of the first voltage stabilizing device is electrically connected to an output terminal of the first node control device at a first node, a second terminal of the first voltage stabilizing device is electrically connected to a first control terminal of the first output device at a second node, and a control terminal of the first voltage stabilizing device is electrically connected to the first clock signal terminal;

a first input terminal of the first output device is electrically connected to the first power signal input terminal, a second input terminal of the first output device is electrically connected to the second power signal input terminal, and an output terminal of the first output device is electrically connected to the first signal output terminal;

in a display stage of a first frequency, the first voltage stabilizing device is configured to be turned on according to a control signal provided by the first clock signal terminal; or in a display stage of a second frequency, the first voltage stabilizing device is configured to be turned on or turned off according to a control signal provided by the first clock signal terminal; wherein the first frequency is greater than the second frequency; and wherein the display stage of the second frequency comprises a first sub-stage and a second sub-stage, and the first sub-stage corresponds to an initialization stage and a data signal writing stage of a pixel circuit, and the second sub-stage corresponds to a light emission stage of the pixel circuit; wherein in the first sub-stage, the first voltage stabilizing device is configured to be turned on according to the control signal provided by the first clock signal terminal; and in the second sub-stage, the first voltage stabilizing device is configured to be turned off according to the control signal provided by the first clock signal terminal.

2. The shift register according to claim 1, further comprising: a second node control device and a second clock signal terminal; wherein a first input terminal of the second node control device is electrically connected to the second power signal input terminal, a first control terminal of the second node control device is electrically connected to the first node, and an output terminal of the second node control device is electrically connected to a second control terminal of the first output device;

a first input terminal of the first node control device is electrically connected to the first power signal input terminal, and a first control terminal of the first node control device is electrically connected to the second clock signal terminal; and in a low level output stage of the first signal output terminal, a low level signal is input into the second clock signal terminal.

3. The shift register according to claim 2, further comprising:

a second signal output terminal; wherein a second input terminal of the first node control device is electrically connected to the second power signal input terminal, and a second control terminal of the first node control device is electrically connected to the second signal output terminal; and wherein the first node control device comprises a first transistor, a second transistor and a third transistor, wherein a first electrode of the first transistor is the first input terminal of the first node control device, a gate of the first transistor is the first control terminal of the first node control device, a first electrode of the second transistor is the second input terminal of the first node control device, a gate of the second transistor and a gate of the third transistor are electrically connected to each other to be the second control terminal of the first node control device, a second electrode of the second transistor is electrically connected to a first electrode of the third transistor, and a second electrode of the third transistor and a second electrode of the first transistor are electrically connected to each other to be the output terminal of the first node control device.

4. The shift register according to claim 3, wherein the first terminal of the first voltage stabilizing device is electrically connected to the second electrode of the first transistor, and the second terminal of the first voltage stabilizing device is electrically connected to the second node.

5. The shift register according to claim 3, wherein the first node control device further comprises a fourth transistor, wherein a first electrode of the fourth transistor is electrically connected to the second electrode of the first transistor, a second electrode of the fourth transistor serves as the output terminal of the first node control device to be electrically connected to the first terminal of the first voltage stabilizing device, and the second terminal of the first voltage stabilizing device is electrically connected to the second node; or the first terminal of the first voltage stabilizing device is electrically connected to the second electrode of the first transistor, the second terminal of the first voltage stabilizing device is electrically connected to a first electrode of the fourth transistor, and a second electrode of the fourth transistor is electrically connected to the second node; and a gate of the fourth transistor is electrically connected to the first power signal input terminal.

6. The shift register according to claim 1, further comprising: a third node control device, a fourth node control device, a second output device, a storage device, a coupling device, a shift register signal input terminal, a third clock signal terminal, a fourth clock signal terminal and a second signal output terminal; wherein a first input terminal of the third node control device is electrically connected to the second power signal input terminal, a second input terminal of the third node control device is electrically connected to the shift register signal input terminal, a first control terminal of the third node control device, an output terminal of the fourth node control device, a first control terminal of the second output device and a first terminal of the storage device are electrically connected at a third node, a second control terminal of the third node control device is electrically connected to the third clock signal terminal, a third control terminal of the third node control device is electrically connected to the fourth clock signal terminal, and an output terminal of the third node control device, a first control terminal of the fourth node control device and a second control terminal of the second output device are electrically connected at a fourth node;

a first input terminal of the fourth node control device is electrically connected to the shift register signal input terminal, a second input terminal of the fourth node control device is electrically connected to the first power signal input terminal, and a second control terminal of the fourth node control device is electrically connected to the third clock signal terminal;

a first input terminal of the second output device is electrically connected to the second power signal input terminal, a second input terminal of the second output device is electrically connected to the fourth clock signal terminal, and an output terminal of the second output device is electrically connected to the second signal output terminal;

a second terminal of the storage device is electrically connected to the second power signal input terminal; and a first terminal of the coupling device is electrically connected to the second node, and a second terminal of the coupling device is electrically connected to the first signal output terminal.

7. The shift register according to claim 1, further comprising: a third node control device, a second voltage stabilizing device, a second output device, a second signal output terminal and a fifth clock signal terminal; wherein a first input terminal of the third node control device is electrically connected to the second power signal input terminal, a first control terminal of the third node control device is electrically connected to a first terminal of the second voltage stabilizing device at a third node, a second terminal of the second voltage stabilizing device is electrically connected to the first control terminal of the first output device, and a control terminal of the second voltage stabilizing device is electrically connected to the fifth clock signal terminal; and in the display stage of the first frequency, the second voltage stabilizing device is configured to be turned on according to a control signal provided by the fifth clock signal terminal; in the display stage of the second frequency, the second voltage stabilizing device is configured to be turned on or turned off according to a control signal provided by the fifth clock signal terminal.

8. The shift register according to claim 7, wherein the display stage of the second frequency comprises a first sub-stage and a second sub-stage, and the first sub-stage corresponds to an initialization stage and a data signal writing stage of a pixel circuit; wherein in the first sub-stage, the second voltage stabilizing device is configured to be turned on according to the control signal provided by the fifth clock signal terminal;

in the second sub-stage, the second voltage stabilizing device is configured to be turned off according to the control signal provided by the fifth clock signal terminal.

9. The shift register according to claim 7, further comprising: a fourth node control device, a shift register signal input terminal, a third clock signal terminal and a fourth clock signal terminal; wherein a second input terminal of the third node control device is electrically connected to the shift register signal input terminal, a second control terminal of the third node control device is electrically connected to the third clock signal terminal, a third control terminal of the third node control device is electrically connected to the fourth clock signal terminal, an output terminal of the third node control device, a first control terminal of the fourth node control device and a second control terminal of the first output device are electrically connected at a fourth node, a first input terminal of the fourth node control device is electrically connected to the shift register signal input terminal, a second input terminal of the fourth node control device is electrically connected to the first power signal input terminal, a second control terminal of the fourth node control device is electrically connected to the third clock signal terminal, and an output terminal of the fourth node control device is electrically connected to the third node;

the first input terminal of the first output device is electrically connected to the second power signal input terminal, the second input terminal of the first output device is electrically connected to the fourth clock signal terminal, and the output terminal of the first output device is electrically connected to the second signal output terminal; and in a high level output stage of the second signal output terminal, a high level signal is input into both of the third clock signal terminal and the fourth clock signal terminal.

10. The shift register according to claim 9, further comprising: a third voltage stabilizing device and a sixth clock signal terminal, wherein a first terminal of the third voltage stabilizing device is electrically connected to the output terminal of the third node control device, a second terminal of the third voltage stabilizing device is electrically connected to a second control terminal of the second output device, and a control terminal of the third voltage stabilizing device is electrically connected to the sixth clock signal terminal; and in the display stage of the first frequency, the third voltage stabilizing device is configured to be turned on according to a control signal provided by the sixth clock signal terminal; or in the display stage of the second frequency, the third voltage stabilizing device is configured to be turned on or turned off according to a control signal provided by the sixth clock signal terminal.

11. The shift register according to claim 10, wherein the display stage of the second frequency comprises a first sub-stage and a second sub-stage, and the first sub-stage corresponds to an initialization stage and a data signal writing stage of a pixel circuit;

in the first sub-stage, the third voltage stabilizing device is configured to be turned on according to the control signal provided by the sixth clock signal terminal;

in the second sub-stage, the third voltage stabilizing device is configured to be turned off according to the control signal provided by the sixth clock signal terminal.

12. The shift register according to claim 10, wherein the third node control device comprises a fifth transistor, a sixth transistor, a seventh transistor and an eighth transistor; wherein a first electrode of the fifth transistor is the first input terminal of the third node control device, a gate of the fifth transistor is the first control terminal of the third node control device, a second electrode of the fifth transistor is electrically connected to a first electrode of the sixth transistor, a gate of the sixth transistor is the third control terminal of the third node control device, a second electrode of the sixth transistor is electrically connected to a first electrode of the seventh transistor to serve as the output terminal of the third node control device, a second electrode of the seventh transistor is electrically connected to a first electrode of the eighth transistor, a second electrode of the eighth transistor is the second input terminal of the third node control device, and a gate of the seventh transistor and a gate of the eighth transistor are electrically connected to each other to be the second control terminal of the third node control device, wherein the first terminal of the third voltage stabilizing device is electrically connected to the second electrode of the sixth transistor, and the second terminal of the third voltage stabilizing device is electrically connected to the second control terminal of the second output device.

13. The shift register according to claim 12, wherein the third node control device further comprises a ninth transistor, wherein a first electrode of the ninth transistor is electrically connected to the second electrode of the sixth transistor, a second electrode of the ninth transistor serves as the output terminal of the third node control device to be electrically connected to the first terminal of the third voltage stabilizing device, and the second terminal of the third voltage stabilizing device is electrically connected to the second control terminal of the second output device; or the first terminal of the third voltage stabilizing device is electrically connected to the second electrode of the sixth transistor, the second terminal of the third voltage stabilizing device is electrically connected to a first electrode of the ninth transistor, and a second electrode of the ninth transistor is electrically connected to the second control terminal of the second output device; and a gate of the ninth transistor is electrically connected to the first power signal input terminal.

14. The shift register according to claim 7, further comprising: a storage device and a coupling device; wherein a first terminal of the storage device is electrically connected to the third node, and a second terminal of the storage device is electrically connected to the second power signal input terminal; and a first terminal of the coupling device is electrically connected to the second node, and a second terminal of the coupling device is electrically connected to the first signal output terminal.

15. The shift register according to claim 10, wherein the first voltage stabilizing device comprises a first voltage stabilizing transistor, a first electrode of the first voltage stabilizing transistor is the first terminal of the first voltage stabilizing device, a second electrode of the first voltage stabilizing transistor is the second terminal of the first voltage stabilizing device, and a gate of the first voltage stabilizing transistor is the control terminal of the first voltage stabilizing device;

the second voltage stabilizing device comprises a second voltage stabilizing transistor, a first electrode of the second voltage stabilizing transistor is the first terminal of the second voltage stabilizing device, a second electrode of the second voltage stabilizing transistor is the second terminal of the second voltage stabilizing device, and a gate of the second voltage stabilizing transistor is the control terminal of the second voltage stabilizing device;

the third voltage stabilizing device comprises a third voltage stabilizing transistor, a first electrode of the third voltage stabilizing transistor is the first terminal of the third voltage stabilizing device, a second electrode of the third voltage stabilizing transistor is the second terminal of the third voltage stabilizing device, and a gate of the third voltage stabilizing transistor is the control terminal of the third voltage stabilizing device; and each of the first voltage stabilizing transistor, the second voltage stabilizing transistor and the third voltage stabilizing transistor is an oxide semiconductor transistor;

wherein the first clock signal terminal, the fifth clock signal terminal, and the sixth clock signal terminal have a same clock signal.

16. A driving method of a shift register, which is applied for driving the shift register according to claim 1, comprising:

in the display stage of the first frequency, controlling, by a control signal of the first clock signal terminal, the first voltage stabilizing device to be turned on;

in the display stage of the second frequency, controlling, by a control signal of the first clock signal terminal, the first voltage stabilizing device to be turned on or turned off;

wherein the first frequency is greater than the second frequency.

17. The driving method according to claim 16, wherein the display stage of the second frequency comprises a first sub-stage and a second sub-stage, and the first sub-stage corresponds to an initialization stage and a data signal writing stage of a pixel circuit; and wherein in the display stage of the second frequency, controlling, by the control signal of the first clock signal terminal, the first voltage stabilizing device to be turned on or turned off comprises:

in the first sub-stage, controlling, by the control signal provided by the first clock signal terminal, the first voltage stabilizing device to be turned on;

in the second sub-stage, controlling, by the control signal provided by the first clock signal terminal, the first voltage stabilizing device to be turned off.

18. The driving method according to claim 16, wherein the shift register further comprises a third node control device, a second voltage stabilizing device, a second output device, a second signal output terminal and a fifth clock signal terminal;

wherein a first input terminal of the third node control device is electrically connected to the second power signal input terminal, a first control terminal of the third node control device is electrically connected to a first terminal of the second voltage stabilizing device at a third node, a second terminal of the second voltage stabilizing device is electrically connected to the first control terminal of the first output device, and a control terminal of the second voltage stabilizing device is electrically connected to the fifth clock signal terminal; and wherein the driving method further comprises:

in the display stage of the first frequency, controlling, by the control signal of the fifth clock signal terminal, the second voltage stabilizing device to be turned on;

in the display stage of the second frequency, controlling, by the control signal of the fifth clock signal terminal, the second voltage stabilizing device to be turned on or turned off.

19. The driving method according to claim 18, wherein the display stage of the second frequency comprises a first sub-stage and a second sub-stage, and the first sub-stage corresponds to an initialization stage and a data signal writing stage of a pixel circuit; and wherein in the display stage of the second frequency, controlling, by the control signal of the fifth clock signal terminal, the second voltage stabilizing device to be turned on or turned off comprises:

in the first sub-stage, controlling, by the control signal of the fifth clock signal terminal, the second voltage stabilizing device to be turned on;

in the second sub-stage, controlling, by the control signal of the fifth clock signal terminal, the second voltage stabilizing device to be turned off.

20. A gate driving circuit, comprising: cascaded shift registers according to claim 1; wherein a shift register signal input terminal of the shift register at a first level is electrically connected to an initial signal input terminal of the gate driving circuit, and the first signal output terminal of the shift register at an i-th level is electrically connected to a shift register signal input terminal of the shift register at an (i+1)-th level; wherein i is a positive integer.

21. A display panel, comprising:

a display region and a non-display region surrounding the display region, wherein the non-display region is provided with a gate driving circuit, and the gate driving circuit is the gate driving circuit according to claim 20; and wherein the display region is provided with a plurality of scanning lines and a plurality of data lines, the plurality of scanning lines and the plurality of data lines are intersected to define a plurality of sub-pixel regions, and each of the plurality of sub-pixel regions is provided with a pixel circuit; wherein the pixel circuit comprises at least one N-type transistor and at least one P-type transistor; and in each row of pixel circuits, a control terminal of the at least one N-type transistor is electrically connected to the first signal output terminal of the shift register at one level through one scanning line, and a control terminal of the at least one P-type transistor is electrically connected to a second signal output terminal of the shift register at the one level through another scanning line;

the display panel can be used in a display device.

* * * * *